United States Patent
Frith

(10) Patent No.: US 8,229,260 B2
(45) Date of Patent: Jul. 24, 2012

(54) OPTICAL FIBER LASER, AND COMPONENTS FOR AN OPTICAL FIBER LASER, HAVING REDUCED SUSCEPTIBILITY TO CATASTROPHIC FAILURE UNDER HIGH POWER OPERATION

(75) Inventor: Gavin P. Frith, Bloomfield, CT (US)

(73) Assignee: Nefern, East Granby, CT (US)

( * ) Notice: Subject to any disclaimer, the term of this patent is extended or adjusted under 35 U.S.C. 154(b) by 0 days.

(21) Appl. No.: 13/220,511

(22) Filed: Aug. 29, 2011

(65) Prior Publication Data

US 2011/0310913 A1    Dec. 22, 2011

Related U.S. Application Data

(62) Division of application No. 11/860,346, filed on Sep. 24, 2007, now Pat. No. 8,027,557.

(51) Int. Cl.
*G02B 6/26* (2006.01)
*G02B 6/36* (2006.01)

(52) U.S. Cl. ............... 385/43; 385/29; 385/48; 385/124; 385/127; 385/128

(58) Field of Classification Search ............... 385/27–29, 385/39, 43, 48–51, 95–99, 123–128
See application file for complete search history.

(56) References Cited

U.S. PATENT DOCUMENTS

| | | | |
|---|---|---|---|
| 5,422,897 A | 6/1995 | Wyatt et al. | |
| 5,712,937 A | 1/1998 | Asawa et al. | |
| 5,815,611 A | 9/1998 | Dhadwal | |
| 5,818,630 A | 10/1998 | Fermann et al. | |
| 6,324,326 B1 | 11/2001 | Dejneka et al. | |
| 6,330,382 B1 * | 12/2001 | Harshbarger et al. | 385/28 |
| 6,335,822 B1 | 1/2002 | Toyohara | |
| 6,445,939 B1 | 9/2002 | Swanson et al. | |

(Continued)

OTHER PUBLICATIONS

Alvarez-Chavez et al.: "Mode selection in high power cladding pumped fibre lasers with tapered section," CLEO/QELS 1999, CWE7.

(Continued)

*Primary Examiner* — Uyen Chau N Le
*Assistant Examiner* — Michael Mooney
(74) *Attorney, Agent, or Firm* — Peter J. Rainville; McDonell Boehnen Hulbert & Berghoff LLP

(57) ABSTRACT

Optical fiber lasers and components for optical fiber laser. An optical fiber laser can comprise a fiber laser cavity having a wavelength of operation at which the cavity provides output light, the cavity including optical fiber that guides light having the wavelength of operation, the fiber having first and second lengths, the first length having a core having a V-number at the wavelength of operation and a numerical aperture, the second length having a core that is multimode at the wavelength of operation and that has a V-number that is greater than the V-number of the core of the first length optical fiber at the wavelength of operation and a numerical aperture that is less than the numerical aperture of the core of the first length of optical fiber. At least one of the lengths comprises an active material that can provide light having the wavelength of operation via stimulated emission responsive to the optical fiber receiving pump light. Components include a mode field adapter and optical fiber interconnection apparatus, which can be used to couple the first and second lengths of optical fiber, or can couple the fiber laser to an optical fiber power amplifier, which can be a multimode or single mode amplifier.

9 Claims, 6 Drawing Sheets

U.S. PATENT DOCUMENTS

| | | |
|---|---|---|
| 6,477,295 B1 | 11/2002 | Lang et al. |
| 6,496,301 B1 | 12/2002 | Koplow et al. |
| 6,519,032 B1 | 2/2003 | Kuebler et al. |
| 6,665,469 B1 | 12/2003 | Schroll et al. |
| 6,751,241 B2 | 6/2004 | Davis et al. |
| 6,785,304 B2 | 8/2004 | Filgas |
| 6,836,607 B2 | 12/2004 | Dejneka et al. |
| 6,948,862 B2 | 9/2005 | Brown |
| 6,975,792 B1 | 12/2005 | Goldberg et al. |
| 6,999,481 B1 | 2/2006 | Jurgensen |
| 2006/0024008 A1 | 2/2006 | Galvanauskas |
| 2006/0263019 A1 | 11/2006 | Negishi et al. |

OTHER PUBLICATIONS

Minelly et al.: "High power diode pumped single-transverse-mode Yb fiber laser operating at 978nm," OFC 2000, vol. 4, PD2, p. 172.

Seo et al.: "Single Mode Laser Oscillation in an Nd-Doped Large Core Double Clad Fiber Cavity with Concatenated Adiabatic Tapers," ETRI Journal, vol. 24, No. 3, Jun. 2002, p. 255.

* cited by examiner

OPTICAL FIBER LASER, AND COMPONENTS FOR AN OPTICAL FIBER LASER, HAVING REDUCED SUSCEPTIBILITY TO CATASTROPHIC FAILURE UNDER HIGH POWER OPERATION

This application is a divisional of U.S. patent application Ser. No. 11/860,346, filed on Sep. 24, 2007, the priority of which under 35 U.S.C. § 120 is hereby claimed.

FIELD OF THE INVENTION

The present invention relates to optical fiber lasers and optical fiber components therefore, having reduced susceptibility to catastrophic failure under high power operation.

BACKGROUND

Optical fiber devices, such as optical fiber lasers and amplifiers, that can provide high output power as well as high beam quality, are of considerable commercial and academic interest. For example, optical fiber lasers that provide a low $M^2$ (a measure of beam quality) and continuous wave (CW) output powers in the range of tens to hundreds or even thousands of Watts have many industrial applications, as do pulsed lasers having good beam quality and high peak powers. In a fiber lasers having a "master oscillator-power amplifier" (MOPA) architecture, a low power laser source (the "master oscillator") provides an input "seed" beam to an optical fiber amplifier (the "power amplifier") that amplifies the seed beam. Unfortunately, nonlinear phenomena, such as Stimulated Raman Scattering (SRS) or Stimulated Brillouin Scattering (SBS), can severely limit scaling the output power of such a fiber laser to higher powers. Furthermore, avoiding nonlinear phenomena as well as maintaining good beam quality can be difficult. Good beam quality typically requires single transverse mode operation of the MOPA, which in turn typically requires optical fibers having cores of relatively small cross sectional area. However, a small cross sectional area results in a higher power density, and high power density more readily triggers nonlinear effects. Increasing the cross sectional are of the core lowers the power density, and helps avoid nonlinearities, but cores having larger cross sectional areas are typically multimode, which tends to degrade the beam quality and hence raise the $M^2$ parameter.

U.S. Pat. No. 5,818,630 teaches one approach for maintaining good beam quality in fibers having cores having larger cross sectional areas. The '630 patent teaches a mode converter that receives an input beam from a laser seed source having a nearly diffraction limited mode. The mode converter converts the mode of the input beam to match a fundamental mode of a multimode fiber amplifier, providing a mode converted input beam to the multimode fiber amplifier. Because the optical energy delivered to the fiber amplifier is matched to the fundamental mode, the amplifier, despite being a multimode amplifier, provides at an output thereof an amplified beam in the fundamental mode. Keeping the multimode fiber of the multimode amplifier as straight as possible helps avoid mode coupling between the fundamental and higher order modes. Mode coupling is undesirable, as energy transferred to higher order modes would then be amplified by the multimode amplifier, which would degrade beam quality. However, the '630 patent indicates that coiling of the fiber can be tolerated without incurring detrimental mode coupling.

It is an object of the present invention to provide improved methods and apparatus for proving higher optical powers from optical fiber devices such as optical fiber lasers and amplifiers.

SUMMARY OF THE INVENTION

In investigating potential designs for a high power optical fiber MOPA apparatus, Applicant initially pursued a design using a commercially available mode field adapter interposed in the optical path between the single mode output fiber of a master oscillator and the multimode input optical fiber of an optical fiber amplifier. Applicant learned that the mode field adapter can suffer catastrophic failures during operation of such high power optical fiber MOPA apparatus. Post mortem examination of the mode field adapter revealed optical fiber simply missing, having apparently exploded and/or vaporized.

The catastrophic destruction is considered to be due to a burst of "backward propagating" optical energy, that is, optical energy apparently originating in, or at least being amplified by, the power amplifier and propagating backwards towards the master oscillator rather than out of the output of the power amplifier. The backward propagating energy can be a sudden and unpredictable pulse. The phenomenon has a rogue nature, akin to the destructive, rogue ocean waves known to suddenly appear and swamp ships on the open sea. The likely mechanisms that create the backward propagating pulse are generally understood. Such rogue pulses generally result when the gain of the amplifier, which is function of the inversion of the active material of the amplifier and other factors, such as spurious feedback, exceeds the losses of the amplifier. Rogue pulses are thus more likely under high inversion, which increases gain. A rogue, backward propagating pulse can be triggered in a high gain system by excessive feedback at the output of the power amplifier. A rogue pulse could occur upon temporary failure of a master oscillator (MO) to provide a seed signal, as the lack of seed signal would lead to high inversion. In a pulsed system, a long mark space between two pulses can also create high inversion, leading to a rogue pulse. Although rogue pulses can be caused by a MO failure, perhaps causing a mode field adapter to fail, it is understood that they could also be the cause of MO failure.

Accordingly, the invention can provide more robust apparatus that can reduce the susceptibility of optical fiber lasers or amplifiers to damage. For example, in one aspect of the invention, there is taught a more robust mode field adapter that is considered less susceptible to catastrophic destruction, as well as, in other aspects, designs and arrangements of fiber based components for making a more robust fiber laser or amplifier. There are many aspects of the invention, which can be practiced alone or in combination. Certain aspects of the invention are described in more detail below.

In one aspect, the invention provides an optical fiber apparatus for having an increased optical power threshold for avoiding damage to the apparatus. The apparatus can comprise an optical fiber mode field adapter having an input and an output, the mode field adapter transforming optical energy from a fundamental mode having a smaller mode field diameter at the input to a fundamental mode having larger mode field diameter at the output. The mode field adapter can include a length of optical fiber comprising a core including a taper wherein the cross sectional area of the core increases; a cladding disposed about the core for tending to confine light to the core so as to be guided by the core; a region disposed about the cladding, the region comprising a material contactingly disposed about the cladding and having an index of refraction that is greater than an index of refraction of the cladding by a selected amount, the region stripping optical energy from the cladding, the selected difference no greater than 0.035; and a second region disposed about and in optical communication with the region, the second region for one or reflecting or absorbing optical energy stripped from said cladding by said region.

The second region can comprise a metal, such as, for example, metal particles within a matrix material. The second region can comprise a solid metal structure, such as an aluminum structure, contacting the region. In various practices of the invention, the aforementioned difference can be no greater than 0.03; no greater than 0.028; no greater than 0.026; no greater than 0.024; no greater than 0.022, or no greater than 0.02. The taper can comprise an adiabatic taper. The mode field adapter can have a wavelength of operation wherein at the wavelength of operation the mode field adapter is single mode at the input and multimode at the output. The mode field adapter can have a wavelength of operation, and the material comprised by the region can have an optical transparency at the wavelength of operation of at least 85%. The optical transparency can be at least 95% or even 100%, as measured by UV/VIS spectroscopy. The cladding can include a taper wherein an outer diameter of the cladding tapers from a smaller diameter to a larger diameter. The cladding of the length of fiber can be substantially free of a taper, meaning that an outer diameter of the cladding remains substantially constant.

The input of the mode field adapter can comprise a length of input optical fiber comprising a core and the output can comprise a length of output optical fiber comprising a core, and the core of the input optical fiber can have a first numerical aperture and the core of the output optical fiber can have a numerical aperture that is less than the first numerical aperture. The input and output each comprise a respective length of optical fiber comprising a core, a cladding disposed about the core and a selected region contactingly disposed about the cladding, where the selected region comprises an index of refraction that is different by a predetermined amount than an index of refraction of the cladding and wherein the predetermined amount corresponding to the input length of fiber and the predetermined amount corresponding to the output length of fiber are both greater in magnitude than the magnitude of the selected difference. The magnitude of the predetermined amount corresponding to the input length of optical fiber can be different than the magnitude of the predetermined amount corresponding to the output length of optical fiber.

In one aspect, the invention provides an optical fiber interconnection apparatus for optically coupling a source of optical energy having an output wavelength and an optical amplifier and having an increased power threshold for avoiding damage to the source or interconnection apparatus from optical energy propagating back from the optical amplifier to the source. The optical fiber interconnection apparatus can comprise an optical fiber arrangement having an input reference plane and an output reference plane and at least one intermediate section of optical fiber having a core spliced at first and second ends, respectively, to the cores of first and second sections of optical fiber. The optical fiber interconnection apparatus can include a first geometrical mismatch and a first numerical aperture mismatch between the core of the intermediate optical fiber and the core of the first section of optical fiber and a second geometrical mismatch and a second numerical aperture mismatch between the core of the intermediate section and the core of the third section of optical fiber. The mismatches can be such that in one direction of propagation, referred to as the forward propagation direction wherein optical energy propagates from an input reference plane to the output reference plane, the geometrical mismatches are from smaller cross sectional area cores to larger cross sectional area cores and the numerical aperture mismatches are from larger numerical aperture cores to smaller numerical aperture cores. In the opposite direction of propagation, wherein optical energy propagates from the output reference plane to the input reference plane, the geometrical mismatches are from larger cross sectional area cores to smaller cross sectional area cores and the numerical aperture mismatches are from smaller numerical aperture cores to larger numerical aperture cores.

The magnitude of the first geometrical mismatch can be greater than the magnitude of the second geometrical mismatch. The first, second and intermediate sections of optical fiber can each include a respective cladding disposed about their respective cores for tending to confine light to each of the cores and there can be a third geometrical mismatch between the cladding of the first section and the cladding of the intermediate section and a fourth geometrical mismatch between the cladding of the intermediate section and the cladding of the second section. The magnitude of the fourth geometrical mismatch can be greater than the magnitude of the third geometrical mismatch. One of the cores to which the core of the intermediate section is spliced can be single mode at a wavelength selected from the range of 1 to 3 microns (or from the range of 1 to 2.2 microns) and the other of the cores is multimode at the selected wavelength. The core of the intermediate section can be multimode at the selected wavelength. Optical fiber of the fiber arrangement can include a cladding disposed about the core of the optical fiber for tending to confine light to the core such that the core guides light and a region contactingly disposed about a length of the cladding, where the region having an index of refraction that is higher than an index of refraction of the cladding for stripping light from the cladding. The region can be disposed about one of the splices of the optical fiber interconnection apparatus. In various practices of the invention the difference between the index of refraction of the region and the index of refraction of the cladding is no greater that 0.035, no greater than 0.030, no greater than 0.028, no greater than 0.026, no greater than 0.024, no greater than 0.022, or no greater than 0.020. The optical fiber arrangement can include a coating contactingly disposed about a different length of the cladding, the coating having an index of refraction that is higher than the index of refraction of the region. A second region can be contactingly disposed about and in optical communication with the region, and the second region can comprise a metal for absorbing light stripped from the cladding by the region.

In another aspect, the invention can provide an optical fiber interconnection apparatus for optically coupling a source of optical energy having a selected wavelength and an optical fiber amplifier and having an increased power threshold for avoiding damage to the source or interconnection apparatus from optical energy propagating back from the optical fiber amplifier to the source. The optical fiber interconnection apparatus can comprise an optical fiber arrangement having an input reference location along an input optical fiber and an output reference location along an output optical fiber, the arrangement comprising at least one intermediate section of optical fiber spliced at first and second ends to other optical fibers, there being a geometrical mismatch between the core of the intermediate optical fiber and the cores of each of the other optical fibers. In one direction of propagation, referred to as the forward propagation direction, optical energy propagates from the input reference location to the output reference location and the geometrical mismatches are from smaller cross sectional area to larger cross sectional area cores and in the opposite direction of propagation, referred to as the reverse propagation, the geometrical mismatches are from larger cross sectional area to smaller cross section area cores. The optical insertion loss of the optical fiber arrangement can be non reciprocal in that the insertion loss in the reverse propagation direction is substantially higher than the insertion loss in the forward propagation direction at a wavelength of operation of the optical fiber interconnection apparatus.

In a further aspect, the invention can provide an optical fiber laser apparatus. The optical fiber laser apparatus can comprise a fiber laser cavity having a wavelength of operation at which the fiber laser cavity provides output light. The fiber laser cavity can include optical fiber that guides light having the wavelength of operation and the optical fiber can have first and second lengths. The first length of optical fiber can have a core having a V-number at the wavelength of operation and a numerical aperture and the second length of optical fiber can have a core that is multimode at the wavelength of operation, a V-number that is greater than the V-number of the first length of optical fiber at the wavelength of operation and a numerical aperture that is less than the numerical aperture of the core of the first length of optical fiber. At least one of the lengths can comprise an active material that can provide light having the wavelength of operation via stimulated emission responsive to the fiber receiving pump light.

The fiber laser cavity can comprise a reflector that can reflect light having the wavelength of operation and transmit light having the wavelength of operation for providing an output from the fiber laser cavity. The second length of optical fiber can comprise the reflector. The reflector can comprise a fiber Bragg grating. The core of the second length of fiber can have a numerical aperture that is no greater than 0.10, no greater than 0.09, no greater than 0.08, no greater than 0.07, no greater than 0.06, or no greater than 0.05. The core of the first length of optical fiber can be single mode at the wavelength of operation. The first length of optical fiber can be spliced to the second length of optical fiber.

The fiber laser apparatus can comprise a third length of optical fiber outside of the fiber laser cavity, where the third length of optical fiber has a multimode core for propagating the output light from the fiber laser cavity, and the fiber laser apparatus can include an optical fiber amplifier in optical communication with the third length of optical fiber. The optical fiber amplifier can comprise optical fiber comprising a core comprising active material for amplifying optical energy having the output wavelength responsive to receiving pump light. The optical fiber of the amplifier can have a core that is normally multimode at the operating wavelength, and the fiber can be coiled such that the optical amplifier is a single mode amplifier.

The optical fiber comprised by the optical fiber amplifier can include a core having a diameter and a numerical aperture that are, respectively, substantially the same as a diameter and the numerical aperture comprised by the core of the third length of fiber. The fiber laser cavity can be substantially free of any optical fiber having a core that is multimode at the wavelength of operation and that comprises the active material. The fiber laser cavity can comprise a mode field adapter arranged so as to provide optical communication between said first and second lengths of optical fiber, said mode field adapter comprising an optical fiber comprising a core having a taper.

The optical fiber laser cavity can comprise an optical fiber arrangement for providing optical communication between the first and second lengths of optical fiber. The optical fiber arrangement can comprise at least one intermediate section of optical fiber having a core spliced at first and second ends, respectively, to the cores of first and second sections of optical fiber. There can be a first geometrical mismatch and a first numerical aperture mismatch between the core of the intermediate optical fiber and the core of the first section of fiber and a second geometrical mismatch and a second numerical aperture mismatch between the core of the intermediate section and the core of the third section of fiber. The mismatches can be such that in one propagation direction for optical energy by the optical fiber arrangement the geometrical mismatches are from smaller cross sectional area cores to larger cross sectional area cores and the numerical aperture mismatches are from larger numerical apertures to smaller numerical apertures.

In yet a further aspect, the invention can provide an optical fiber laser having first and second fiber Bragg gratings for reflecting light having a selected wavelength therebetween so as to define a fiber laser cavity. The fiber laser cavity can comprise optical fiber and a selected length of the optical fiber can comprise a rare earth for providing optical gain such that the fiber laser cavity provides output light having the selected wavelength responsive to the cavity receiving pump light. The optical fiber of the fiber laser cavity can comprise both multimode and single mode optical fiber arranged for guiding light having the selected wavelength and that is reflected by the fiber Bragg gratings, where the terms "single mode" and "multimode" are used with reference to the core of the optical fiber at the selected wavelength. The first fiber Bragg grating can be comprised by single mode fiber and the second fiber Bragg grating can be comprised by multimode fiber. The second fiber Bragg grating can have a selected transmissivity at the selected wavelength for providing the output light from the fiber laser cavity and the fiber laser apparatus can comprise a length of multimode fiber delivering the output light from the fiber laser cavity.

At least a majority of the optical gain can occur within single mode fiber of the fiber laser cavity. The fiber laser cavity can be substantially free of any multimode optical fiber that comprises the rare earth. The fiber laser apparatus can include a coupler for coupling pump light to the fiber laser cavity, and the coupling can be achieved within the fiber laser cavity. In one practice, the coupler couples pump light substantially only to single mode fiber of the fiber laser cavity. The fiber laser cavity can comprise single mode fiber having a first numerical aperture and multimode fiber a having a core having a second numerical aperture that is less than said first numerical aperture. In various practices of the invention, the second numerical aperture is no greater than 0.11, no greater than 0.10, no greater than 0.09, no greater than 0.08, no greater than 0.07, no greater than 0.06, or no greater than 0.05. The fiber laser cavity can comprise large mode area (LMA) multimode fiber.

The optical fiber of the optical fiber laser cavity can comprise a section having a core, a cladding disposed about the core and a material contactingly disposed about the cladding and having an index of refraction that is higher than an index of refraction of the cladding by a selected amount. In one practice, the amount is no greater than 0.035. In other practices of the invention, the selected amount can be no greater than 0.030, no greater than 0.028, no greater than 0.026, no greater than 0.024, no greater than 0.022, or no greater than 0.020. The material can selectively strip light from said cladding. The fiber laser apparatus can include an optically absorbing region contactingly disposed about said material for absorbing the stripped light. The fiber laser cavity can comprise multimode double clad fiber.

Certain terms are used above and elsewhere herein. Stating herein that a first region is disposed about a second region means that the first region surrounds, at least partially, the second region, and may or may not contact the second region, as "disposed about" does not preclude the existence of an intermediate region or regions interposed between the first region and the second region. A splice, such as, for example, a fusion splice, is well known in the fiber optic art. A fusion splice can be accomplished by the application of localized heat sufficient to fuse or melt the ends of two lengths of optical fiber. A fusion splicing apparatus that uses an electrical arc discharge to provide localized heating is commercially available from companies such as Fujikura and Sumitomo, both of Japan. Fusion splices between identical and aligned fibers are often possible wherein the splice loss is rather low (e.g. not greater than 0.1 dB) at an operating wavelength or over an operating range of wavelengths of the spliced optical fibers. The term "splice," as used herein, is not limited to fusion splices, and includes, for example, fibers that are butt coupled together using, for example, an adhesive at the region of the joint and/or mechanical means (e.g., threaded connectors), to secure the butt joint together. The butt joint can, but preferably does not, include a small gap between the ends of the butt coupled fibers.

"Optical fiber" is not to be taken as limited to a continuous, undisturbed length of optical fiber whose characteristics are substantially longitudinally unvarying, such as would be formed in a conventional well run draw and spooling procedure using a preform mounted on a draw tower, but can include, for example, similar or dissimilar sections of fiber spliced together. "End," as used when referring to an "end" of an optical fiber, is not limited to a physically free end, but can include a location along a fiber, such as wherein one particular fiber is joined to what was initially a separate fiber. For example, a fiber can have an "end" at a splice. A "length" or "section" of optical fiber can refer to a distance between reference planes. The term "light" or "optical energy", as used herein, means, as understood by one of ordinary skill in the optical arts, the electromagnetic energy associated with the optical apparatus in question, and is not to be limited to, for example, wavelengths visible to the human eye, which is a definition that can be found in certain dictionaries intended for laypersons. Ranges stated herein, such as of wavelengths, include the endpoints (e.g., between 1 micron to 2 microns includes 1 and 2 microns). The terms "first," "second," "third," etc. are used as convenient designators that more readily allow for clear antecedent basis for subsequent references to, for example, a region or section of a fiber. For example, stating that a first length of fiber has a first core and a second length of fiber has a second core should not, taken alone, be taken to mean that the second length of fiber must have two (first and second) cores simply because reference was made to a second core of the second fiber. A "region" need not be homogeneous throughout and can be comprised, for example, of more than one layer. One region being "contactingly disposed" about another means in such physical proximity such that any intervening substance or material has no substantial detrimental effect on the intended primary functional relationship, (e.g., light stripping) between the regions.

The multimode power amplifiers in MOPA configurations are often based on optical fibers generally referred to as Large Mode Area (LMA) fibers, though to Applicant's current knowledge there is not a specific, universal definition of the term "LMA" in the art. An LMA fiber typical includes both a larger core diameter (typically greater than 10 microns) as well as a lower numerical aperture (NA) than a single mode fiber. As one of ordinary skill in the art understands, the NA of a fiber is related to the angle of the cone of rays that can be guided by the fiber, such as by total internal reflection, and for a conventional step index fiber can be calculated as the square root of the difference of the squares of the refractive index of the core and the refractive index of the cladding. The lower NA of the fiber increases the Mode Field Diameter (MFD) of the fundamental mode fiber, which reduces the power density so as to avoid nonlinearities, as well as lowers the V-number, such that the fiber, while typically multimode at the wavelength of operation of the MOPA, supports fewer modes than it would if it had a larger NA, helping preserve beam quality. The term multimode, as used herein, means that the region of fiber of interest, typically the core, can support more than just the fundamental mode (i.e., can support transverse modes in addition to the fundamental, or $LP_{01}$, mode at the operational wavelength of interest). The operational wavelength of interest is typically the desired wavelength at which the laser apparatus provides light responsive to the optical pumping, which can be determined, for example, by the gain and absorption spectra of the active material and the resonance wavelength of the fiber laser cavity. For example, a core that can support both $LP_{01}$ and $LP_{11}$ is considered multimode. V-number, for a round core, step index fiber or effective equivalent, can be defined as (Diameter of core×NA of core× $\pi$)/(wavelength of operation). A V-number greater than 2.405 typically means that the core of the fiber can support more than one transverse mode, meaning that the core is multimode. Higher V-number fibers support more higher order modes.

Further advantages, novel features, and objects of the invention will become apparent from the following detailed description of non-limiting embodiments of the invention when considered in conjunction with the accompanying FIGURES, which are schematic and which are not necessarily drawn to scale. For purposes of clarity, not every component is labeled in every one of the following FIGURES, nor is every component of each embodiment of the invention shown where illustration is not considered necessary to allow those of ordinary skill in the art to understand the invention.

DETAILED DESCRIPTION

Figure 1:
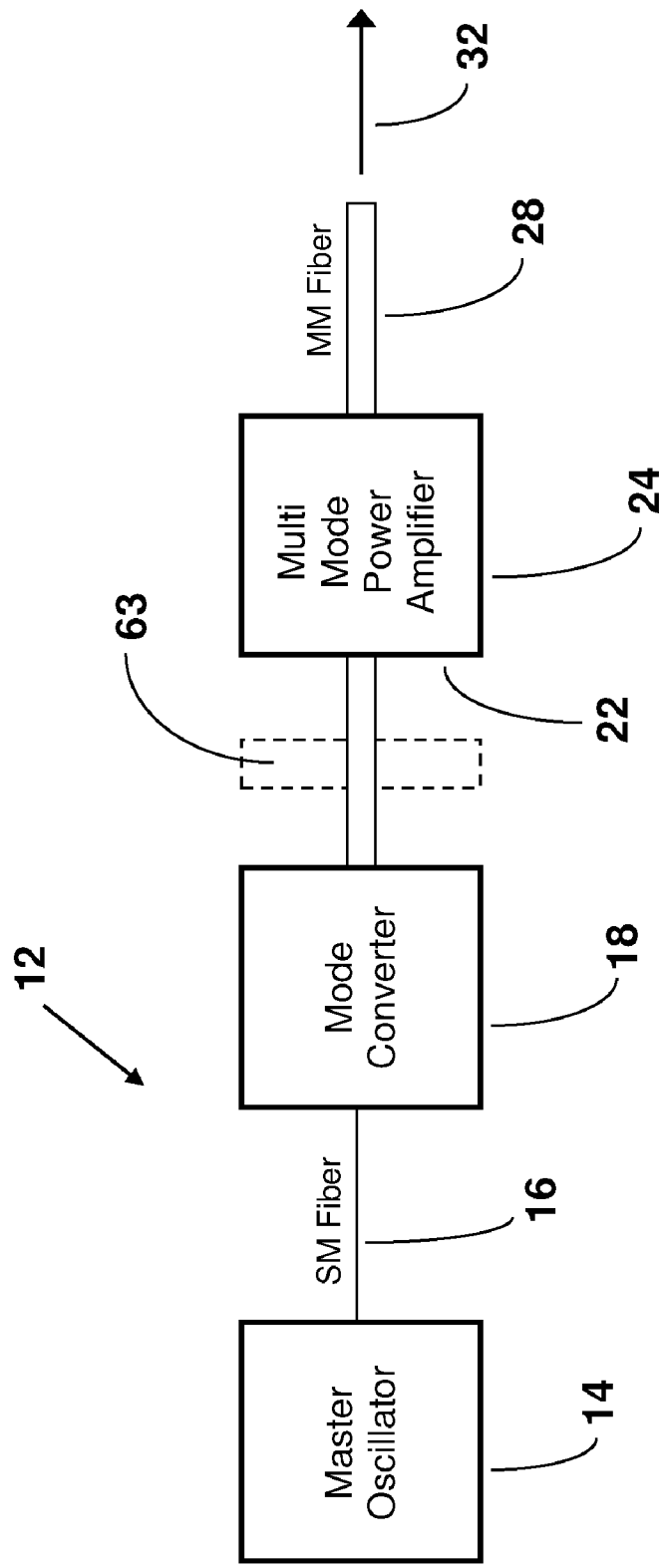
FIG. 1 schematically illustrates one example of a prior art optical fiber master oscillator-power amplifier (MOPA) apparatus.

FIG. 1 schematically illustrates one example of a prior art optical fiber MOPA apparatus 12. The MO 14 can comprise, for example, a single mode (SM) fiber laser that includes a pair of Fiber Bragg Gratings (FBGs) that define a laser cavity for generating the output of the MO 14. The length of SM fiber 16 delivers the output from the laser cavity to the mode converter 18. Accordingly, the MO 14 can provide a SM (e.g., diffraction limited) input beam along the SM fiber 16 to the mode converter 18. The input beam is thus in the fundamental mode and has a small diameter modal profile. The mode converter 18 receives the input beam and converts the fundamental mode of the input beam to match the modal profile of the fundamental mode of the optical fiber multimode (MM) power amplifier 24. The fundamental mode of the MM power amplifier 24 has a different modal profile, such as by at least having a larger diameter than the modal profile of the SM input beam delivered by fiber 16 to the mode converter 18. The mode converter 18 thus converts the modal profile of the input beam to match the modal profile of the fundamental mode of the optical MM amplifier and delivers, via MM optical fiber 22, the mode converted beam to the MM power amplifier 24. Because of the mode matching to the fundamental mode, the MM power amplifier 24, despite being capable of amplifying multiple modes, is excited only in the fundamental mode (fundamental mode as used herein refers to $LP_{01}$), and hence can provide an output only in the fundamental mode along MM optical fiber 28, thus providing an output beam 32 having good beam quality. The MO 14 and MM power amplifier 24 can each include a pump source for pumping the active media, respectively, of the MO 14 and the MM power amplifier 24. The active media typically comprises a rare earth, such as, for example, ytterbium.

As noted above in the Summary, Applicant found that commercial mode field adapters interposed between MO seed sources and optical amplifiers can suffer catastrophic failures during operation of the high power optical fiber MOPA apparatus. Optical fiber of the mode field adapter virtually ceases to exist, apparently exploding or vaporizing, and apparently due to a burst of "backward propagating" optical energy. "Backward propagating" optical energy refers to optical energy apparently originating in, or at least being amplified by, the power amplifier and propagating backwards towards the MO rather in the other direction, as is normal, and out of the output of the power amplifier. Accordingly, Applicant has considered the damage mechanisms and discloses optical apparatus, and methods for making and using such apparatus, to reduce susceptibility to damage from such rogue pulses such that when they do occur the optical apparatus can more readily survive.

Without wishing to be bound by theory, Applicant's understanding of the structure and operation of a mode field adapter is now discussed along with the likely damage mechanisms, as a preface to Applicant's teaching of more robust optical apparatus having reduced susceptibility to damage from rogue, backward propagating pulses.

A fiber optic mode field adapter can use a fiber taper, in which a fiber is melted and stretched so that its diameter (and therefore core size) varies continuously over a length understood to be at least several millimeters (several thousands of wavelengths). The core physically tapers from having a smaller cross section, and hence a smaller modal profile for the fundamental mode, to a larger cross section, and hence a larger modal profile. The mode field adapter can be interposed between two SM optical fibers having different modal profiles to decrease the insertion loss over just splicing the two fibers together. Matching the modal profile is important because is well known that any mismatch between the MFDs of fundamental modes (such as in a splice between SM fiber having different modal profiles) increases the insertion loss considerably for transmission between the fundamental modes. The transmission factor, $T_{FM}$, as a result of MFD mismatch in the fundamental mode is given by the formula:

$$T_{FM}=4/[(MFD_1/MFD_2)+(MFD_2/MFD_1)]^2$$

Where $MFD_1$ is the mode field diameter of one of the fundamental modes and $MFD_2$ is the mode field diameter of the other fundamental mode. For equal MFDs, the transmission is 1; however, for unmatched, or unequal MFDs, the transmission factor is less than 1 and decreases quickly as mismatch between the MFDs increases.

In most MOPA configurations, it is desired that the mode field adapter convert the fundamental modes, not between SM fibers, but between a SM fiber and a MM fiber so as to match the modal profile of the fundamental mode of the SM fiber to that of the MM optical fiber. Here matching is critical, because energy not transferred between fundamental modes does not merely increase insertion loss, but will likely excite higher order modes in the MM optical fiber. As the MM optical amplifier is quite capable of amplifying higher order modes (by definition it is a "multimode" amplifier), any excitation of the higher order modes will result in an output beam that includes higher order modes and hence is detrimental to beam quality (raises $M^2$). However, when the fiber taper is carefully made, including being sufficiently gradual, the modal profile of the fundamental mode gradually expands in size without transferring energy out of the fundamental mode (e.g., into lossy leaky modes or into higher order modes), such that the optical energy currently confined at one end of the taper to the size of the $LP_{01}$ mode of a SM fiber is converted along taper, as the taper increases, to a increasing modal profile. A gradual taper avoids a "mismatch" along the taper. When the profile matches the desired profile of the fundamental mode of the MM fiber, the taper must stop to avoid a mismatch with the MM fiber to which the mode converter matches, as that would also excite higher order modes (this is presumably done in practice by starting with the MM fiber and tapering it down to a SM fiber). Thus a mode field adapter designed to convert one modal profile to match another, such as matching the modal profile of a SM optical fiber to a MM optical fiber, can have two advantageous features—very low insertion loss and no excitation of higher order modes in the MM optical fiber. Analogies exist in the electrical field—a transformer, for example, transforms the impedance of a load to match that of a source so as to ensure that all the power of the source is delivered to the load. As another example, in antenna theory, the spacing of a parallel-conductor transmission line can be tapered gradually over a long distance for the purpose of impedance matching an RF signal generator to an antenna.

Figure 2:
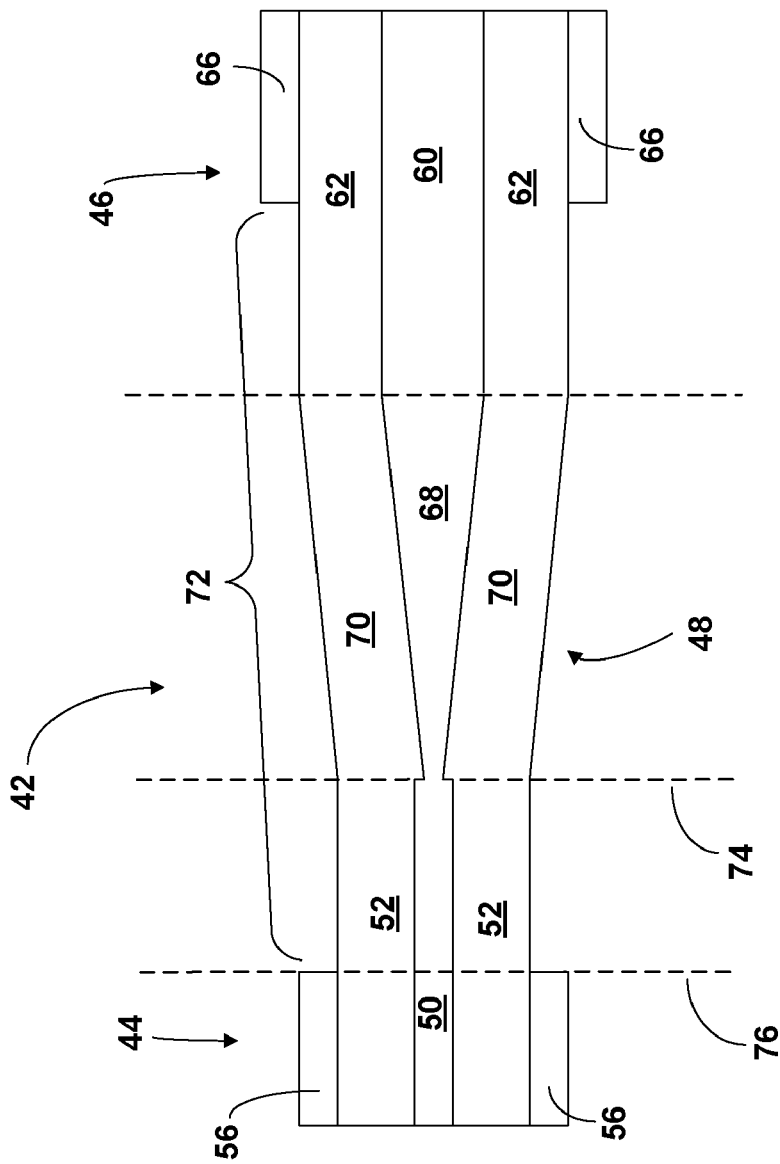
FIG. 2 schematically illustrates Applicant's understanding of a prior art mode field adapter.

FIG. 2 schematically illustrates Applicant's understanding of a prior art mode field adapter 42. The mode field adapter 42 comprises a SM input fiber section 44, a MM output optical fiber section 46, and a tapered length of fiber 48 between the SM input fiber 44 and the MM output optical fiber section 46. The input optical fiber section 44 includes a SM core 50 and a silica glass cladding 52 surrounding the SM core 50, as well as a polymer coating 56 surrounding the silica glass cladding 52. The polymer coating 56 of the input optical fiber section 44 typically has a higher index of refraction than the silica glass cladding 52. The output optical fiber section 46 is typically a double clad fiber including a MM core 60, an inner cladding, or "pump," cladding 62 surrounding the core 60, and a polymer coating 66 surrounding the inner cladding 62. The polymer coatings 56 and 66 are understood to likely be removed along the tapered section 48, which includes the tapered core 68 and tapered cladding 70, and perhaps as well as along adjacent portions of the input and output fiber sections, as indicated in FIG. 2. Either no recoating is understood to be present, such that the mode converter is "air" clad along the section indicated by reference numeral 72, or a perhaps a low index recoating, having an index of refraction that is less than the index of refraction of the tapered cladding 70 and which would cause light to tend to be confined in the cladding, may be used. As noted above, in practice, the mode field adapter is most likely fabricated by tapering the larger output fiber section 46 to reduce the diameter of the core to the point where the MFD becomes close to, or if desired for mode conversion, matches the MFD of the SM input fiber section 44, and the SM input fiber section 44 and tapered end are spliced together, such as at the location indicated by reference numeral 74. Other techniques may be possible, such as, for example, specially designing the input fiber section 44 such the that the core can be gradually expanded as a function of length using thermal techniques to make a section akin to section 72 wherein the diameter of the core increases as shown in FIG. 2. In a fiber having such a thermally expanded core (TEC), the outside diameter of the cladding may not be not tapered. With reference to FIG. 1, it is understood that a mode converter that matches the MFDs can provide nearly 100% of the optical power from the fundamental mode of the SM optical fiber 16 to the fundamental mode of the MM optical fiber 22.

Applicant purchased commercially available mode field adapters from ITF Labs, 400 Montpellier Boulevard, Montreal, Quebec H4N 2G7, Canada, understood to be equivalent to current model number MFA100S2021 (from which the following specifications are noted). The purchased mode field adapters had an operating wavelength range of 1040-1080 nm and included Corning™ HI 1060 input optical fiber, having, to the best of Applicant's understanding, a core having a diameter of approximately 6 microns, a silica glass cladding having a diameter of 125 microns, and polymer coating disposed about the silica glass cladding. The core is understood to have a numerical aperture of 0.15 relative to the cladding, the polymer coating is understood to have an index of refraction of about 1.5, as opposed to a refractive index of about 1.452 for the silica glass cladding (at 1060 nm). The purchased mode field adapters included a double-clad output fiber having an output fiber having a core diameter of approximately 20 microns, a first cladding having diameter of approximately 400 microns, and a second cladding comprising a low index polymer. The NA of the core to first cladding of the output fiber is approximately 0.06 and the NA of the first cladding to the second cladding of the output fiber is approximately 0.46. The purchased mode field adapters were used in the MOPA architecture shown in FIG. 1. The MOPA architecture was intended to ultimately be capable of CW output powers in the hundreds of Watts. A plurality of such mode field adapters catastrophically self-destructed during operation of the MOPA in which they were used. Inspection after catastrophic failure indicated that fiber was entirely missing where one would have expected to find a taper (thus Applicant's uncertainly as to the exact structure of the taper, as only post mortem inspections were made of the purchased mode field adapters, and at this point fiber was simply missing). Applicant assumes that the mode field adapters at least included a tapered section of core as generally shown in FIG. 2.

Applicant considers the catastrophic failure to occur, at least in part, because of the concentration of energy by the mode field adapter when subjected to backward propagating optical energy. For forward propagating optical energy, that is, optical energy propagating from the input fiber section 44 to the output fiber section 46, the tapered section 48 likely slowly (e.g., adiabatically) expands the MFD of the fundamental mode of the SM core of the input fiber so as to avoid excitation of higher order modes and to match the fundamental mode of the MM output optical fiber. The forward propagating optical energy is of low power and the power density decreases even more as the tapered section expands the MFD. However, under reverse or backward propagation, the opposite can be true—first, the reverse propagating optical energy can be a pulse having a high power density, and second, the tapered section 48 now serves to concentrate the energy, increasing the power density such that it exceeds the damage threshold of one or more materials of the mode field adapter. The lack of an outer coating over the tapered section 48, such that it is essentially "air" clad (or the use of coating having a lower index of refraction than the cladding 70, such that the coating acts as cladding) tends to promote concentration of energy by confining any leaked optical energy to the cladding 70. However, brightness conservation means that under reverse propagation some light must leave the core 68, as the light is being confined to a smaller cross sectional area and brightness cannot be increased by a passive device. Some light therefore leaks into the cladding. Furthermore, the reverse propagating energy may be MM and hence have higher order modes that have a high NA. The tapered section 48 also more readily causes the NA of the higher order modes of the backward propagating light to exceed that of the tapered core relative to its cladding, leaking optical energy into the cladding, as the angle of reflection becomes less shallow due to the taper.

Leaked optical energy may propagate in claddings 70 and then 52 until it reaches location 76, wherein the much higher refractive index of the coating 56 of the Corning HI 1060 input fiber to the silica cladding 52 very rapidly strips the light into the coating 56, causing burning or damage to the coating 56. Damage to the coating 56 can raise the optical absorption of the coating 56, further increasing damage. This vicious cycle of damage and attendant increased energy absorption may lead to a "thermal runaway" that very rapidly destroys the mode converter 42. In summary, Applicant considers that the prior art mode field adapter likely allows backward propagating optical energy to become too concentrated and when stripped from the cladding within the mode converter, to be stripped in too rapid and localized a manner.

Applicant's experiments were performed with what ITF's product literature describe as "mode field adapter", whereas the term "mode field converter" is used in the '630 patent. "Mode field adapter" is used by Applicant as a broader term that includes within its ambit, but is not necessarily limited to, a "mode field converter" that converts the mode of input beam to "match" the fundamental mode of a MM amplifier. Accordingly, as the terms are used herein, not every device that is a mode field adapter need be a mode field converter, but a mode field converter would be considered a mode field adapter.

Isolators are known in the art. Isolators have non-reciprocal insertion loss and can be used to protect a source, such as a master oscillator, from backward propagating optical energy. An appropriate isolator 63 could be positioned between the mode converter 18 and MM power amplifier 24 of FIG. 1, and would help protect both the MO 14 and the mode converter 18. However, this adds an additional and typically expensive component to the MOPA design, raising cost and complexity.

Furthermore, fiber pigtailed optical isolators are typically based on reflection and Faraday rotation using bulk materials. Such isolators typically require coupling light out of the input pigtail for propagation in free space and/or the bulk material and re-coupling light back into the output pigtail. Accordingly, an isolator can be sensitive to temperature fluctuations and vibrations, as the fluctuations and/or vibrations can affect internal optical alignment of the isolator.

Figure 3:
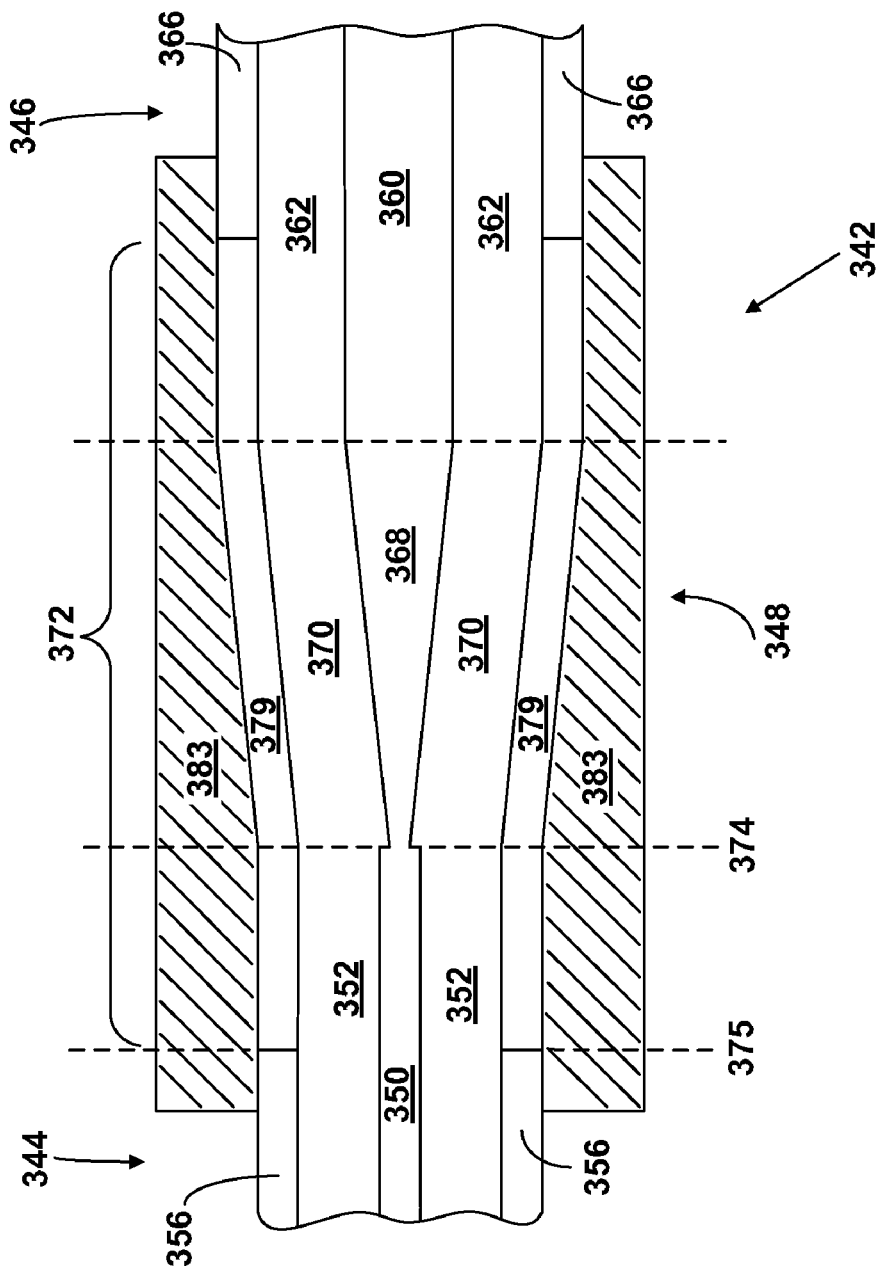
FIG. 3 schematically illustrates one embodiment according to the invention of an improved optical fiber coupling apparatus for providing decreased susceptibility to catastrophic damage to a source or to the optical fiber coupling apparatus from rogue optical energy propagating back from the optical fiber amplifier to the source.

FIG. 3 schematically illustrates one embodiment according to the invention of an optical fiber coupling apparatus for optically coupling a source of optical energy having a selected wavelength and an optical amplifier and having decreased susceptibility to catastrophic damage to the source or coupling apparatus from optical energy propagating back from the optical amplifier to the source. With proper design, the optical fiber coupling apparatus 342 may have reduced susceptibility to catastrophic failure under high power operation as well as be able to mode field convert the fundamental mode of a SM fiber to match the fundamental mode of a MM fiber. Accordingly, in such practices, the optical coupling apparatus can be used as the mode converter shown in FIG. 1.

The optical coupling apparatus 342 comprises an input optical fiber section 344, typically a SM input fiber, a MM output optical fiber section 346, and a section of fiber 348 between the input optical fiber section 344 and the MM output fiber 346. The fiber section 348 includes at least a core 368 including a taper, as shown in FIG. 3. The cladding 370 of the section 348 may also include a taper, as shown in FIG. 3. The input optical fiber section 344 comprises a core 350 and a cladding 352, typically a silica glass cladding, disposed about the core 350, as well as a polymer coating 356 disposed about the cladding 352. The output fiber section 346 is typically a double clad fiber including a MM core 360, an inner cladding, or "pump," cladding 362 surrounding the core 360, and a second cladding 366 surrounding the inner cladding 362. The second cladding 366 can comprise a polymer coating having a refractive index that is less than a refractive index of the inner cladding 362.

The optical coupling apparatus 342 can be fabricated by tapering the larger output fiber 346 to reduce the diameter of the core to the point where the MFD approaches or matches the MFD of the SM input fiber section 344, and the SM input fiber and tapered end are spliced together, such as at the location indicated by reference numeral 374. Other techniques may be possible, such as, for example, specially designing the input fiber section 344 such the that the core can be gradually expanded as a function of length using thermal techniques to make a section akin to section 372 wherein the diameter of the core increases as shown in FIG. 2.

The optical coupling apparatus 342 of FIG. 3 can include a region 379 contactingly disposed about the cladding 370 of the section 348, such as, for example, along the length indicated by reference numeral 372. The region 379 should comprise an index of refraction that is higher than an index of refraction of the underlying region (e.g., the cladding 370 in FIG. 3), but too large an index difference is avoided. The index difference is selected to be small enough to slowly extract the leaking optical energy such that dissipation occurs over wider area and catastrophic failure is avoided, or at least the threshold therefore is pushed out to higher power levels. The index difference between the region and the cladding 370 about which the region is disposed can, in various practices of the invention, be no greater than 0.035, no greater than 0.030, no greater than 0.028, no greater than 0.026, no greater than 0.024, or no greater than 0.020. In some practices of the invention, the index of refraction of the region 379 is no greater than 1.49357 no greater than 1.48857, no greater than 1.486, no greater than 1.48357 or no greater than 1.47857. References to the foregoing indices of refraction of the region 379 can refer to the index of refraction as measured at 587 nm. Because an absolute value for an index of refraction can vary to a certain degree with wavelength, it is preferable at times to refer to the differences between the indices of refraction of regions, which can be those at a wavelength of operation of the device or region. Typically the claddings 352, 362 and 370 are substantially similar (e.g., all comprise silica glass) such that selecting the region 370 to have a selected index difference with one of the claddings means that substantially the same difference exists with the others of the claddings. The region 379 need not have the full extent shown in FIG. 3, though it is likely preferable that the region 379 extends to either side of location 374 as this is where the backward propagating optical energy may be most likely be concentrated and/or escape, especially if the optical apparatus includes a splice at location 374.

It is also considered desirable that the region 379 be highly optically transparent (e.g., as close to 100% as possible) at the wavelengths of light to be stripped, which wavelengths would typically include the wavelength of the output light from a fiber laser or optical fiber amplifier. This prevents significant absorption of any stripped light. The highly transparent nature of region 379 should also reduce the thermal stress on the region due to stripping the backward propagating rogue energy. The region can be comprised of an epoxy having the foregoing optical characteristics. As optical transparency at the wavelength of stripped light may not always be specified by manufacturers of materials that region 379 can include, data for optical transparencies according to UV/VIS spectroscopy, which are often specified, may have to be relied upon in choosing one material over another. Data from IR spectroscopy would be preferable in cases where IR wavelengths are nearer to the intended operating wavelength of the optical fiber coupling apparatus. It is also desirable that the region be comprised of a material having appropriate thermal properties, such as good heat conduction and a high degradation temperature. The material should not degrade at temperatures well above the temperature at which a standard optical fiber protective coating may degrade (e.g., about 100° C.). Epoxies are available that have thermal degradation temperatures of at least 200° C. The temperature characteristics should be such as to avoid the "thermal runaway" described above as suspected of contributing to the catastrophic failure.

The optical coupling apparatus 342 can further include another region 383 disposed about region 379. The region 383 can, in various practices of the invention, serve one or more of several purposes. For example, the region 383 can comprise a housing that confines region 379 (e.g., if region 379, comprises, for example, a liquid). The region 383 can provide mechanical support for region 379, such as by comprising a rigid structure to which region 379 adheres. Neither the region 383 nor the region 379 need completely surround the fiber of the optical coupling apparatus 342. For example, the optical fiber of the coupling apparatus, including the core and cladding, can lie in a groove cut in a structure of solid metal (e.g., a piece of aluminum) and the region 379 can comprise an epoxy interposed between the optical fiber and the piece of aluminum. The epoxy can secure the fiber to the aluminum comprised by the region 383. The region 383 can have a good thermal conductivity for helping to remove heat from region 379. For example, the region 383 can be in thermal communication with the region 379 and can have a thermal conductivity of, for example, in various practices of the invention, at least 25 Watt/meter-Kelvin ("W/MK"), at least 50 W/MK, at least 75 WM/K, at least 90 W/MK or at least 100 W/MK.

Figure 4:
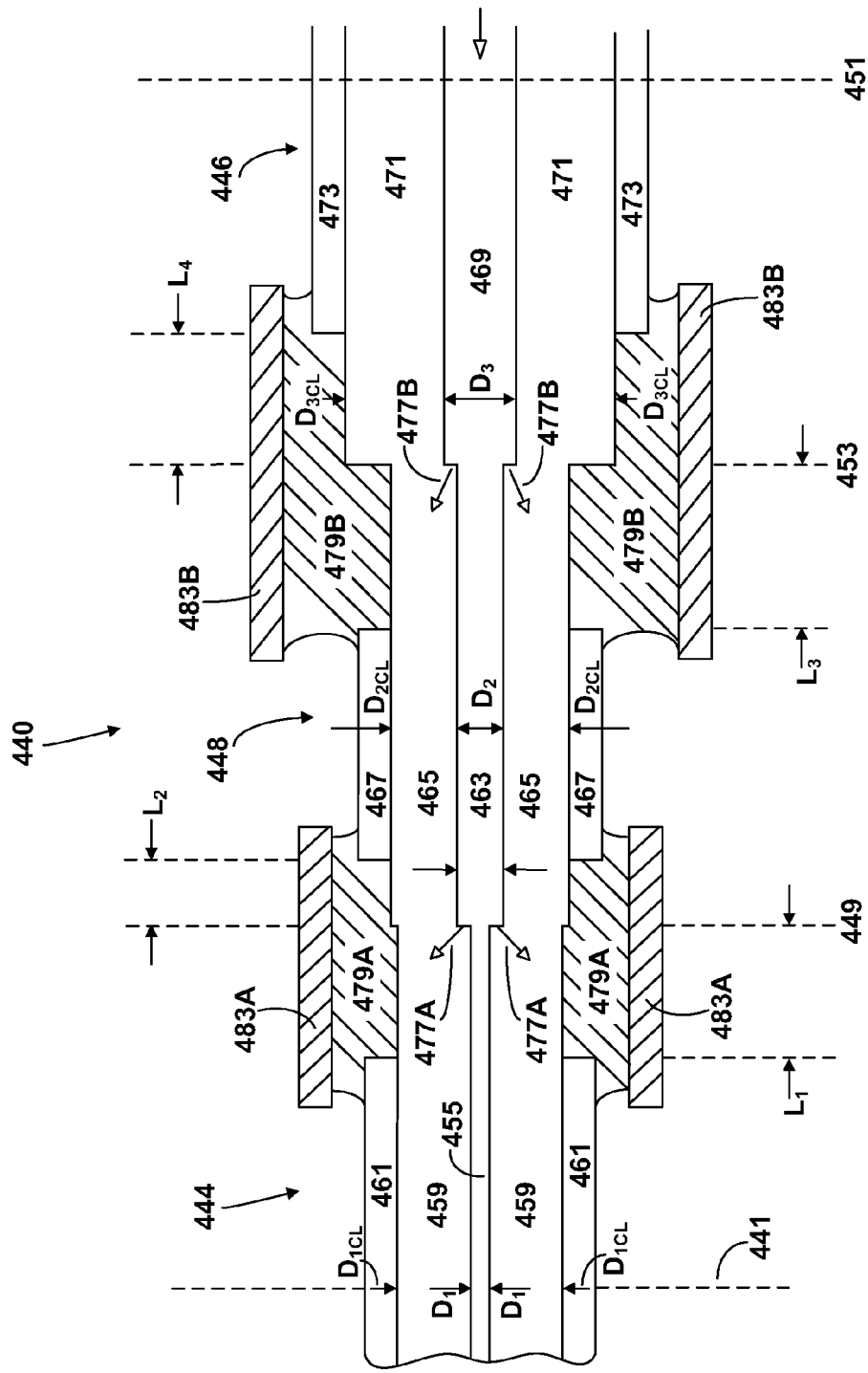
FIG. 4 schematically illustrates an alternative embodiment according to the invention of an optical fiber coupling apparatus for providing decreased susceptibility to catastrophic damage to a source or to the optical fiber coupling apparatus from rogue optical energy propagating back from the optical fiber amplifier to the source.

The region 383 can facilitate the safe disposal of optical energy stripped by the region 379, and can be contactingly disposed about the region 379, as shown in the embodiment of the invention illustrated in FIG. 4. The goal is to safely dispose of the stripped rogue optical energy and to hence avoid damage to optical apparatus. The region 383 can be absorptive, but preferably only to the extent that provision is made for thermal transfer from the region 383 to avoid overheating. However, it is also possible that the region 383 can have a reflectivity such that optical energy is directed out of the region 379, such as away from the optical interconnection apparatus 440 and into the ambient environment. For example, in one practice FIG. 3 can represent a top view, looking down, on a groove machined into a piece of aluminum comprised by region 383, and, as noted above, region 379 can comprise epoxy that adheres the section 372 of fiber to the aluminum. In this instance optical energy can be reflected from aluminum and scattered up out of the region 379 (i.e., out of the plane of the page) and into the ambient environment. The region 383 can comprise a combination of absorptive and reflective properties. Broadly considered, the region 383 has a transmittance that is different (e.g., less and usually much less) than that of region 379, as optical energy that is reflected or absorbed by a material is not transmitted. Transmittance generally refers to the ratio of the total radiant energy transmitted through and emerging from a body to the total radiant energy incident on the body. Relative transmittance can be determined by measuring the ratio of incident optical energy to transmitted optical energy for a narrow collimated light beam normally incident on sample of each of the regions, where the samples have the same thickness, which should be of the order of a thickness used in the region 379 of an optical coupling apparatus. Region 383 can comprise a metal, such as, for example, a pure metal, or a matrix that includes metallic particles, or an alloy of different metals. Region 383 can comprise a ceramic or other material, such as graphite or carbon. Region 383 can include one or more of the foregoing together as well as with other materials.

It is noted that "pump dumps" are known in the prior art for providing localized stripping of unabsorbed pump light from the inner cladding of a double clad fiber. In such a pump dump, the second cladding, which is typically a low index coating that provides the inner cladding with a high (e.g., 0.46) numerical aperture such that the inner cladding may propagate pump light, is removed from the double clad fiber along a short length of the fiber. Along the short length the removed second cladding is replaced with a material having a higher index of refraction for stripping the pump light from the inner cladding. The material in such prior art pump dumps can have high (e.g., 100%) optical transmissivity at the wavelength of the pump light and an index of refraction difference with the inner cladding that is low, (e.g., between 0.02700 and 0.02800) as 0.02743, for example. In such a prior art pump dump, neither the core nor the inner cladding of double clad fiber are understood to be tapered. The pump dump is intended to strip residual pump light that was previously deliberately introduced into the cladding, not rogue light initially propagating in the core and that suddenly leaks to the cladding. The material can be an epoxy that can contact a metal structure, such as an aluminum block, that absorbs pump light stripped from the inner cladding by the material.

The optical apparatus of FIG. 3 is thus considered to be more robust and to be able to mode field adapt while providing more protection against catastrophic failure due to rogue backward propagating pulses of energy. However, the apparatus 342 of FIG. 3 still includes a taper that inevitably undesirably concentrated backward propagating light. It is possible that the higher order modes of MM backward propagating light may be dissipated over an extended length of the taper, helping with safe power dissipation. For example, each higher order mode is associated with a different angle of reflection from the interface between the core 368 and the cladding 370, and the higher the order of the mode, the less shallow (compared to the boundary) the angle of reflection. For backward propagating light, the taper increases the angle (decreases the shallowness) such that the NA of higher order modes will exceed the NA of the core as determined by the index difference between the core and the cladding. Accordingly, optical energy of higher order modes will more readily enter the cladding than that of lower order modes. A practical taper may be somewhat non linear and may distribute the energy extraction of higher order modes by the cladding over some finite distance, thereby reducing the power density somewhat, such that the low index coating 379 may safely extract the optical energy.

However, the handling by a taper of backward propagating light in lower order modes, as well as in the fundamental mode, may be of more concern, in that the taper by design has very low loss for such light and will mode adapt the fundamental mode upon backward propagation to concentrate the light until it reaches a power density that cannot be tolerated by the taper, leading to localized thermal failure of the taper or perhaps damage to the MO if the concentrated light is delivered to the MO. Thus a more controlled dissipation of higher order mode light, and perhaps an even deliberately increased and distributed dissipation of light in the fundamental mode so as to avoid concentration, may provide a greater safety margin regarding avoiding damage in high power operation. An additional concern is that precisely tapering the core and the cladding of a fiber is time consuming and can require specialized skills and equipment not widely possessed. Alternative solutions may be of interest that are simpler to fabricate and that may even provide a wider safety margin.

Accordingly, FIG. 4 schematically illustrates an alternative embodiment according to the invention of a optical fiber coupling apparatus for providing decreased susceptibility to catastrophic damage to a source or to the optical coupling apparatus from rogue optical energy propagating back from the optical amplifier to the source.

The optical fiber interconnection apparatus 440 can comprise an input reference plane 441 located along an input section of optical fiber 444 and an output reference plane 451 located along an output section of optical fiber 446. As used herein, "forward propagation" of optical energy refers to propagation in the direction from the input reference plane 441 to the output reference plane 451 and "reverse propagation" refers to light propagating in the direction from the output reference plane 451 to input reference plane 441. The optical fiber interconnection apparatus 440 can be interposed between a source and power amplifier so as to forward propagate a seed beam from the optical source to the optical power amplifier.

The optical fiber interconnection apparatus 440 can include at least one intermediate section 448 of optical fiber. The intermediate section 448 is intermediate to, and different than other sections of optical fiber such that there is one or more selected mismatches (e.g., geometrical mismatches and/or numerical aperture mismatches) between the core comprised by the intermediate section 448 and the cores of the sections (in the embodiment shown in FIG. 4, sections 444 and 446) in optical communication with (e.g., spliced to) the core of the intermediate section 448.

Each deliberate mismatch, as discussed in more detail below, provides for a selective and distributed directing of backward propagating optical energy from the cores of the fiber to the claddings of the fibers where the mismatched fibers meet (e.g., are spliced). Provision can then be made proximate to the splice to safely strip the rogue energy from the claddings and dispose of the energy. Such provision can include first regions disposed about the claddings adjacent the splices between mismatched cores, where the first regions comprise a material having a selected higher index of refraction relative to that of the cladding and high optical transparency for conducting to other regions (e.g., regions comprising a metal) disposed about first regions, where the other regions facilitate safe disposal of the rogue, backward propagating optical energy. The selected mismatches divert backward propagating energy in the higher order modes, as well as in the fundamental mode, which is directed to claddings, stripped and disposed.

As opposed to the mode field adapter, precise tapers, which can be difficult to make, can be avoided, and instead simple sections of different, but constant diameter fibers can be spliced together. In addition, the use of at least two splices between mismatched fibers distributes the stripping of rogue backward propagating energy to two known locations for enhanced resistance to failure due to excessive power density at any one location. Backward propagating energy is not concentrated such that it leaves the core at an unknown location therealong; backward propagating energy leaves at the splices where provision can be provided adjacent the mismatch, and not necessarily along the entire length of the interconnection apparatus, for safely dealing with the rogue energy. The optical fiber interconnection apparatus is typically much longer than the taper of a mode field adapter. For example, where the interconnection apparatus includes three sections, such as in FIG. 4, each of the sections can be about a meter in length (as opposed to a taper, which may extend only over centimeters).

Although the invention is not limited to any particular number of sections, in the embodiment shown in FIG. 4, there are three sections of optical fiber, namely, the input section of optical fiber 444, the intermediate section 448 and the output section 446. The intermediate section 448 of optical fiber can be spliced to the input section 444 at plane 449 and to the output section 446 at plane 453. The input section 444 can comprise a core 455, a cladding 459 disposed about the core 455, and a region 461, which in the embodiment schematically shown in FIG. 4 comprises a standard protective acrylate polymer coating, disposed about the cladding 459. Such standard protective coatings are understood to typically have a refractive index difference of at least +0.45 relative to the cladding 459. The input optical fiber 444 can be a SM fiber such that the core 455 is single-moded at a wavelength of operation of the optical fiber interconnection apparatus 440, which is typically the wavelength at which the optical source provides, and the optical amplifier amplifiers, optical energy. For example, the core 455 can be single-moded, at least in some wavelengths in the range from 1-3 or in the range 1-2.2 microns, or over the entire span of one or both of the foregoing ranges. The core 455 of the input section 444 can have a diameter $D_1$ at a location therealong, such as at one or both of the reference planes 441 and 449, and cross sectional area $A_1$, (not shown), taken perpendicular to the elongate axis of the input section 444 of optical fiber, and a numerical aperture $NA_1$ relative to the cladding 459.

The intermediate section of optical fiber 448 can comprise a core 463, a cladding 465 disposed about the core 463, and can also include a region 467, which in the embodiment shown in FIG. 4 comprises the aforementioned standard protective acrylate polymer coating having an index of refraction that is greater than an index of refraction of the cladding 465. The core 463 can comprise a diameter $D_2$ and a cross sectional area (not shown) $A_2$ and a numerical aperture $NA_2$ relative to the cladding 465.

The output section of optical fiber 446 can comprise a core 469, a cladding 471 disposed about the core 469, and region 473 disposed about the cladding 471, where the region 473 typically comprises one or more acrylate polymer coatings. However, the output section of optical fiber 446 is typically a double clad, or a "cladding pumped" fiber such that the cladding 471 is dimensioned and/or otherwise adapted (e.g., has a noncircular outer circumference to enhance mode mixing) to serve as a pump cladding. Accordingly, the acrylate polymer comprised by the region 473 typically has a lower index of refraction selected to provide a high NA (e.g., 0.46) of the cladding relative to the region 473, such that the cladding 471 can guide the pump light. The core 469 of the output section 446 can have a diameter $D_3$, a cross section area $A_3$, and a numerical aperture $NA_3$ relative to the cladding 471 disposed about the core 469.

There can be a geometrical mismatch between the core 455 of the input section 444 and the core 463 of the intermediate section 448. The term "geometrical mismatch" as used herein is used to compare similar regions (e.g., to compare two cores or to compare two claddings) of optical fiber, and is to be taken as the square of the ratio of diameters of the two regions, with the larger diameter being in the numerator, such that the geometrical mismatch is always 1 or greater than 1. If a region is shaped, such that it does not have a constant diameter when viewed in cross section taken perpendicular to the elongate axis of the fiber, an effective diameter can be used, where the effective diameter is the diameter that gives the correct cross sectional area for a circle having the same cross sectional area that defined by the outer boundary of the shaped area. For example, the geometrical mismatch between the core 455 having diameter $D_1$ and core 463 having a diameter $D_2$ is $(D_2/D_1)^2$ If the diameter $D_1$ is about 7 microns and the diameter $D_2$ is about 15 microns, then the magnitude of the geometrical mismatch is $(15/7)^2$, or about 4.6.

A simple approximation formula can apply to the transmission of highly MM light between coupled fibers having cores having different cross sectional areas, when the transmission is considered as from a larger cross section fiber to a smaller cross section fiber. In such case, the transmission factor $T_{GM}$ is given by:

$$T_{GM} = (A_2/A_1)^2 \text{ (applies only when } A_2 \leq A_1 \text{, otherwise } T_{GM} = 1)$$

Thus a geometrical mismatch can introduce a non-reciprocal loss for MM light. In the case of coupling between the core 455 of the input section 444 of optical fiber and the core 463 of the intermediate section 448 of optical fiber (as well as between the core 469 of the output section 446 and the core 463 of the intermediate section 448) backward propagating MM light will experience, in simple theory, a reduction in transmission, as determined by the factor $T_{GM}$ in each case, because in each instance the geometrical mismatches for backward propagating light are from cores having larger cross sectional areas to cores having smaller cross sectional areas. Forward propagating light will not be affected. The MM light not transmitted across the geometrical mismatch will be lost to the claddings of the fiber, as indicate by reference numerals 477A in the case of the geometrical mismatch between the cores 463 and 455 and by reference numerals 477B, in the case of the geometrical mismatch between cores 469 and 463.

The optical interconnection apparatus 440 can also include selected NA mismatches between the cores of the input and intermediate sections and the cores of the intermediate and output sections of optical fiber. Such NA mismatches can also be non reciprocal for MM light, and hence can be arranged according to the invention to also only affect backward propagating light. For transmission from core having a numerical aperture $NA_1$ to a core having a numerical aperture $NA_2$ that is less than $NA_1$, the transmission factor $T_{NA}$ can be approximated by:

$$T_{NA}=(NA_2/NA_1)^2 \text{ (for } NA_2 \leq NA_1 \text{ only, otherwise } T_{NA}=1)$$

The NA mismatches can cause additional rogue energy to be lost to the claddings of the sections of fiber, as can also be indicated by reference numerals 477A in the case of the NA mismatch between the cores 463 and 455 and by reference numerals 477B, in the case of the NA mismatch between cores 469 and 463.

Thus, in one practice of the invention, $A_1 < A_2 < A_3$ and $NA_1 > NA_2 > NA_3$, which provides two mismatches, which are each geometrical and NA mismatches, that are non-reciprocal and affect backward propagating light only.

Thus in the embodiment shown in FIG. 4, in the forward propagation direction, the geometrical mismatches proceed from smaller cross sectional area cores to larger cross sectional area cores and the NA mismatches are from a higher NA to a lower NA. Accordingly, in the backward direction of propagation, the opposite holds—the geometrical mismatches proceed from larger cross sectional area to smaller cross section area cores and the NA mismatches proceed from lower NAs to higher NAs. As one of ordinary skill in the art can discern, based on the disclosure herein, the input section 444 can have a lower V number at the wavelength of operation than that of the intermediate section 448, which can in turn have a lower V number than that of the output section 446, as V-number is a function of the product of the NA and core diameter.

The geometrical and/or NA mismatches between the sections of optical fiber of the optical fiber interconnection apparatus of FIG. 4 will also introduce loss for the fundamental mode. Generally speaking, the MFD of a fundamental mode is a function of both the diameter (or cross sectional area) and the NA of the core. Larger diameters and smaller NAs provide larger MFDs, and concomitantly, smaller diameters and larger NAs provide smaller MFDs. As the above equation for $T_{FM}$ indicates, a mismatch between MFDs reduces the transmission factor $T_{FM}$ between the fundamental modes of the cores of two fibers in optical communication. Generally the MFD of the fundamental mode of a fiber is slightly less than the diameter of the core, though the degree to which the MFD is less increases as the fiber diameter increases. For example, consider a SM mode fiber having a fundamental mode MFD of approximately 7 microns (which is a typical fiber on which a MO could be based), and a MM fiber having a fundamental mode having an MFD of 24 microns (a good approximation for a optical fiber power amplifier based on a large mode area (LMA) fiber having a core having a diameter of 30 microns). The above equation for $T_{FM}$ yields a transmission factor $T_{FM}$ for unaided optical communication between such fibers (e.g., butt coupling instead of interposing a mode field converter therebetween) of approximately 0.3, meaning that only 30% of the optical energy in the fundamental mode of the SM fiber makes it into the fundamental mode of the MM fiber (and vice-versa).

This low transmission factor $T_{FM}$ is beneficial and desired as to backward propagating light, given sufficient provisions according to the invention for safely disposing of such light. However, the loss in fundamental mode light is reciprocal, and also applies to forward propagating light, which can create at least two disadvantages. First, power output of the MOPA can be reduced because less optical energy reaches the power amplifier in the desired fundamental mode. This however, can be a factor of less importance. Often the power amplifier runs in a saturated state such that the output power of the overall MOPA in the fundamental mode is not linearly related to the input power and accordingly is not as drastically reduced (e.g., not reduced to 30% of what it could be). Also, pump power can be increased to boost the amplification and thus output power of the power amplifier and hence the MOPA so as to reach a certain desired power output (albeit at reduced operating efficiency).

A second effect is of more concern: the 70% power mismatch between fundamental modes means that 70% of the power in the incident fundamental mode is available to excite, and does excite, higher order modes in the MM fiber. In the backward propagation direction, this is not of much concern, as the geometric and NA mismatches are such that the MM light is stripped, and it is desired to fully attenuate the rogue pulse anyway. The forward propagation direction is different—the higher order modes are not attenuated by the geometric and NA mismatches and proceed to the MM amplifier, where they are readily amplified, degrading beam quality (reducing the $M^2$) of the output beam of the MOPA. Fortunately, however, as discussed below, this disadvantage can also be addressed, albeit at the expense of added complexity.

Overall, the insertion loss of the optical fiber interconnection apparatus can be considered nonreciprocal, that is, different in the forward propagation direction than in the reverse direction. If the insertion loss is to be defined by specifying that the core of the fiber at the reference plane of interest (i.e., for forward propagation, reference plane 441 and for reverse propagation, reference plane 451) insertion loss is measured by substantially illuminating the entire cross sectional area of the core. Accordingly, higher order modes, if supported by the core, are excited. To determine insertion loss the power present in substantially all core modes propagating at the other reference plane is measured, and the ratio of this power to total power launched into the core and the other reference plane determines the insertion loss. Accordingly, in one practice of the invention, the optical insertion loss of the fiber optical interconnection apparatus is non reciprocal. It is expected (using the equations noted above and typical values for core diameters) that the insertion loss can be at least 0.5 dB, 1 dB, 1.5 dB, 2 dB or even 3 dB higher when measured in the reverse propagation direction than when measured in the forward propagation direction. The factors $T_{FM}$, $T_{GM}$ and $T_{NA}$ are illustrative for conceptual purposes, and though in theory the insertion measured (for the appropriate type of light) due to a factor, such as $T_{GM}$, for example, is $10 \log T_{GM}$, in practice the actual insertion loss will vary. One of ordinary skill in the art understands that if it is desired to measure the insertion loss experienced only by the fundamental mode, care must be exercised to ensure that one is not measuring higher order mode light.

To safely deal with the backward propagating light directed to the claddings, the optical fiber interconnection apparatus preferably includes one or both of regions 479A and 479B, which comprises a region having a higher index of refraction than the claddings about which they are disposed, but wherein the index difference between the claddings and the regions is selected to be sufficiently low to more safely strip the optical energy from the claddings. Considerations discussed above with regard to region 379 (e.g., index of refraction values, as well as index differences between the region 379 and the cladding about which it is disposed) of the mode field adapter of FIG. 3 apply to the regions 479A and 479B of the fiber optical interconnection apparatus 440 as well and are not repeated here.

The optical interconnection apparatus 440 can further include a metal (e.g., aluminum) or other absorptive regions 483A and 483B disposed, respectively, about regions 479A and 479B for safely disposing of optical energy stripped by the region 379. Again, considerations discussed in regard with regions 483 of FIG. 3 apply with equal force to the optical regions 483A and 483B of FIG. 4. Thus the geometrical and/or NA mismatches thus introduce controlled, non-reciprocal loss to backward propagating light at two different locations, where specific provision, in the form of regions 479A and 479B and 483A and 483B can more safely dissipate stripped optical energy. For higher order modes, forward propagating light is not affected, according to the above approximations for $T_{GM}$ and $T_{NA}$.

As shown in FIG. 4, the optical fiber apparatus 440 can simply include sections of spliced optical fiber arranged in series and can be an "all optical fiber arrangement," which means, as used herein, that that the optical communication from the input reference plane to the output reference plane is predominantly or exclusively via optical fiber, and does not, for example, include significant free space communication or the use of discrete lenses and the like.

The cross sectional area $A_1$ of the core 455 of the input section 444 of optical fiber can remain substantially constant along substantially all of the input section 444 of optical fiber, such as along substantially all of the distance between reference planes 441 and 449. Similarly, and independent of considerations regarding the input section, the cross sectional area $A_2$ of the core 463 of the intermediate section 448 of optical fiber can remain substantially constant along substantially all of the intermediate section 448 of optical fiber, such as along substantially all of the distance between reference planes 449 and 453. Similar considerations can independently apply to the output section of optical fiber: the cross sectional area $A_3$ of the core 469 of the output section 446 of optical fiber can remain substantially constant along substantially all of the output section 446 of optical fiber, such as along substantially all of the distance between reference planes 453 and 451. However, one or more of the optical fiber sections could also include a taper. Such a taper could be used to increase or decrease the magnitude of a mismatch. The distances $L_1$, $L_2$, $L_3$, and $L_4$ shown in FIG. 4 can each be on the order of millimeters. For example, each of $L_1$, $L_2$, $L_3$, and $L_4$ can be approximately 20 millimeters.

Thus the use of two (or more) splices between three (or more) simple sections of fiber can avoid the specialized requirements in terms of one or more of skill, time and equipment to fabricate a precise taper. Furthermore, the use of two (or more) geometrical and/or NA mismatches forces a distributed and controlled leaking of the rogue backward propagating energy in such a way that it may be more readily safely dissipated. If necessary, more mismatch locations (splices between mismatched fibers) can be added for further distribution of the dissipation of the rogue energy. The use of a plurality of splices can have another advantage, in that it reduces the overall loss of fundamental mode light from the input optical fiber 444 to the output optical fiber 446 (as opposed to a splice directly from the input optical fiber 444 to the output optical fiber 446).

The optical fiber interconnection apparatus 440 can include geometrical mismatches between claddings as well as between cores. As indicated in FIG. 4, the cladding 459 of the input section 444 can have a diameter $D_{1CL}$, the cladding 465 of the intermediate section 448 can have a diameter $D_{2CL}$, and the cladding 471 of the output section 446 can have a diameter $D_{3CL}$. In one practice of the invention considered to reduces loss in the forward propagation direction, the magnitude of the geometrical mismatch between the cladding 459 of the input section 444 and the cladding 465 of the intermediate section 448 is less than the magnitude of the geometrical mismatch between the cladding 465 of the intermediate section 448 and the cladding 471 of the output section 446.

In another practice of the invention, the magnitude of the geometrical mismatch between the core 455 of the input section 444 and the core 463 of the intermediate section 448 can be less than the magnitude of the geometrical mismatch between the core 463 of the intermediate section and the core 469 of the output section 446. The foregoing is considered advantageous when present in conjunction with aforementioned condition for the relative magnitudes of the geometrical mismatches between the claddings.

The optical fiber interconnection apparatus of FIG. 4 can have advantages. It can provide a useable and more robust transition from a MO based on a fiber having a smaller cross sectional area core to an optical fiber power amplifier based on fiber having a core having a larger cross sectional area. Also, the optical fiber interconnection apparatus can be simpler to fabricate than the mode field adapter of FIG. 3, and by deliberately introducing loss to the fundamental as well as higher order modes, can more likely protect the MO from the backward propagating energy. However, such benefits are not achieved without drawbacks. For example, as evident from calculation above regarding MFD mismatches, the optical fiber interconnection apparatus of FIG. 4 does not convert and match fundamental modes. To continue with the electrical analogy noted earlier, the effect of the missing mode conversion function can be compared with leaving out an impedance matching transformer between a radio frequency (RF) signal source and a load having an input impedance that is mismatched to output impedance of the RF signal generator. The two similar penalties are (1) poor coupling of power to the load, with attendant loss of power output and (2) the power that isn't coupled into the load can cause problems, such as an unacceptably high standing wave ratio between the RF generator and the load.

Accordingly, when input section 444 comprises a SM core the fundamental mode of the core of input section is not converted so as to match the fundamental mode of the MM output optical fiber 446. Analogous to (1) above, whereas a mode converter can have very low loss in the forward direction, due to the adiabatic taper and matching of modes, the optical fiber interconnection apparatus of FIG. 4 can have significantly increased insertion loss in the forward direction (e.g., 1 dB), due to the reciprocal nature of fundamental mode loss. Analogous to the "other problems" of (2) above, the mismatches, even for propagation in the forward direction, launch light into the higher order modes of the intermediate section 448 and/or the output section 446 of the optical fiber interconnection apparatus. Thus a MM power amplifier receiving its input from the optical fiber interconnection apparatus will amplify these higher order modes and have reduced beam quality. The first problem, as noted above, can be of lesser concern, and can be addressed by increasing pump power. Dealing with the second problem—higher order mode excitation—is now discussed.

Figure 5:
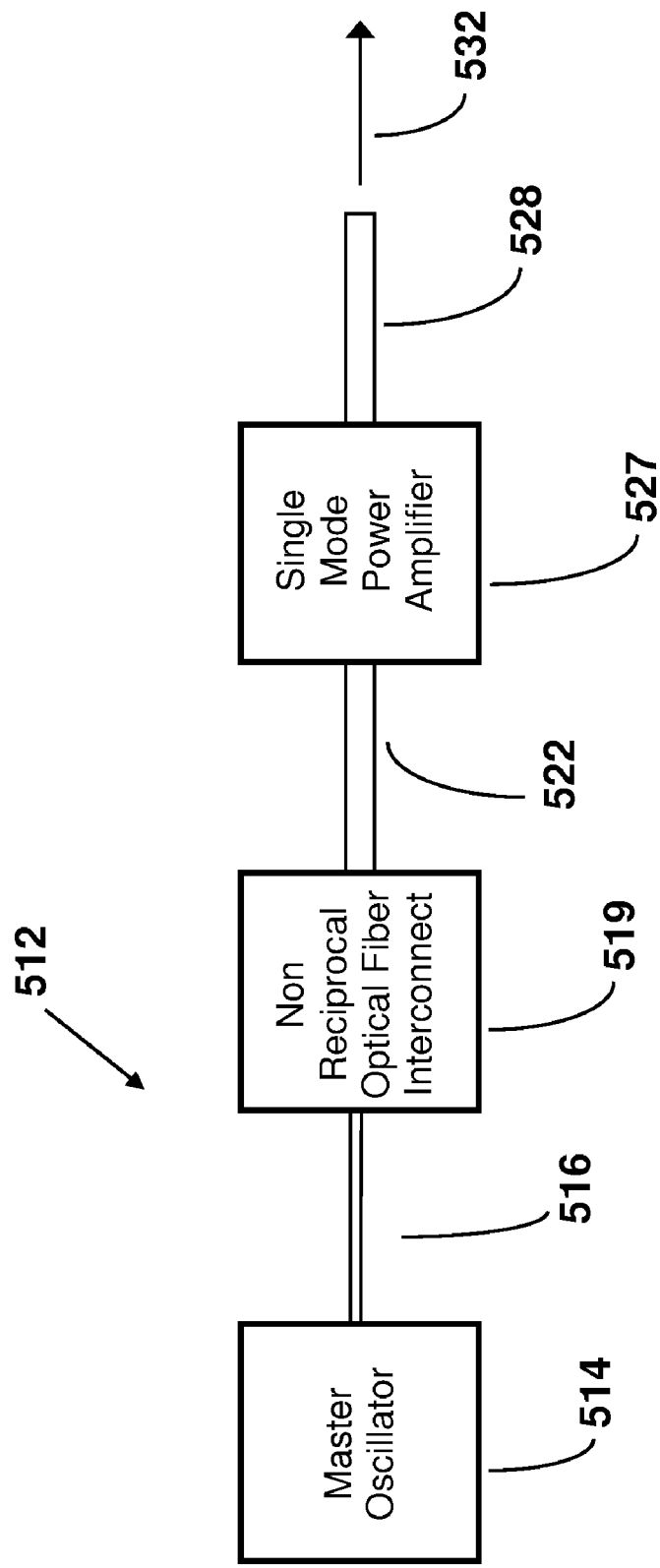
FIG. 5 schematically illustrates one embodiment of an optical fiber master oscillator-power amplifier apparatus that includes the optical fiber coupling apparatus of FIG. 4.

With reference to FIG. 5, one embodiment of the invention includes the MO 514, SM optical fiber 516, an optical coupling apparatus, such as the optical fiber interconnection apparatus of FIG. 4 having a MM output section of optical fiber and, as opposed to a MM amplifier, a SM amplifier 527. The SM amplifier, though based in whole or in part on an optical fiber having an increased core size and hence lower power density for forestalling the onset of nonlinearities, amplifies only the fundamental mode, such that the output optical fiber 528 provides an output beam 532 having good beam quality.

Such SM amplifiers are known in the art. For example, U.S. Patent Application Publication U.S. 2006/0024008 A1, ("'008 Application") published Feb. 2, 2006 and listing Almantas Galvanauskas as inventor, teaches a composite waveguide comprising a central core and at least one side core helically wound about the central core and in optical proximity to the central core. The central core may be configured for large mode areas, that is, have a large cross sectional area, akin to that of a MM core of an optical fiber. However, the composite structure of the central core and helical side core can provide efficient and highly selective coupling between higher-order modes in the central core and helical side core. Further, the composite structure provides high loss for modes propagating in helical side core and hence imparts high loss onto the coupled higher-order modes of central core. Thus the central core of the fiber is effectively SM. The core can be doped with an active material and pumped to provide amplification.

U.S. Pat. No. 6,496,301, ("'301 patent") issued on Dec. 17, 2002 to Koplow et al., and entitled "Helical Fiber Amplifier" teaches another example of a SM amplifier. The '301 patent teaches winding doped optical fiber having an increased core size into coils having a carefully selected radius such that the bend loss provides spatial filtering such that higher order modes that would otherwise propagate are highly attenuated. The attenuation of the fundamental mode remains low. The optical fiber, though having a core having an increased cross sectional area for reducing susceptibility to nonlinearities, is essentially single mode. In an optical fiber power amplifier based on this technique higher order modes are not amplified.

The techniques of the '008 Application and the technique of the '301 patent have similarities as well as difference. In both techniques, a central core of the amplifier fiber has an increased cross sectional area to reduce power density and forestall the onset of nonlinearities. In the '008 Application technique, higher order modes that would otherwise exist in such a core are coupled to the side core, which spirals around the main core. The spiraling, in addition to helping selectively couple only the higher order modes and not the fundamental mode, includes a lot of bending of the side core and introduces a high bend loss to those higher order modes such that they are attenuated. The '301 patent bends the core of the amplifier directly, to a critical radius, that introduces high bend loss only to the higher order modes of the central core of the amplifier fiber. The '008 Application requires a complex fiber, but not complicated fixturing to achieve a critical bend radius, whereas the '301 patent uses a simpler fiber design but can require more complicated and precise fixturing (as well as some fiber design modification).

The SM power amplifier 527 can be based on either of the foregoing techniques, though the '301 patent technique has seen considerably more practical application. The SM amplifier can provide an amplified output beam 532 having good beam quality. Although the use of the SM amplifier, as opposed to a simpler MM power amplifier, adds complexity, it can also be beneficial in that the amount of rogue, backward propagating energy in higher order modes should in theory be reduced due to the attenuation of higher order modes provided by the SM amplifiers of the designs discussed above.

Applicant considers that it may be possible to provide yet further protection against damage from rogue backward propagating energy by further distribution of the dissipation of the backward propagating optical energy. With reference to FIG. 1 (or FIG. 5), the MO 14 (514 in FIG. 5) typically includes a laser cavity comprising, for example, a pair of reflectors spaced along a length of optical fiber doped with an active material, such as a rare earth, for providing light responsive to the doped section of fiber receiving pump light. Many types of reflectors are known in the art, including, for example, bulk or deposited mirrors, which can be dichroic for passing pump energy in an end pump configuration, fiber loop reflectors, and even just the cleaved end faces of optical fibers. However, in many designs a reflector comprises a fiber grating written into an optical fiber using actinic radiation, as this technique is now well established in the fiber optic art. The fiber laser cavity typically comprises one "high reflector," which can be designed to reflect as near 100% of the optical energy incident thereon at the output wavelength of the laser cavity as possible. The other reflector, often referred to as the "output reflector" or "output coupler," can have a reflectivity that is typically considerably less than 100%, such as, for example, 20% or less, so as to transmit a selected amount of optical energy at the operating wavelength of the fiber laser cavity (e.g., the wavelength at which the gratings are the most reflective) and provide an output from the fiber laser cavity.

In one practice of the invention, the fiber laser cavity of the MO includes the optical fiber interconnection apparatus 440 of FIG. 4. For example, the optical fiber interconnection apparatus 440 can be situated within the fiber laser cavity of the MO, such as between the reflectors, and shielded, at least partially, from backward propagating energy by the output coupler, which will at least partly reflect the backward propagating rogue energy back from whence it came, where apparently is has much less of a propensity to do harm (as it was generated there to begin with).

Figure 6:
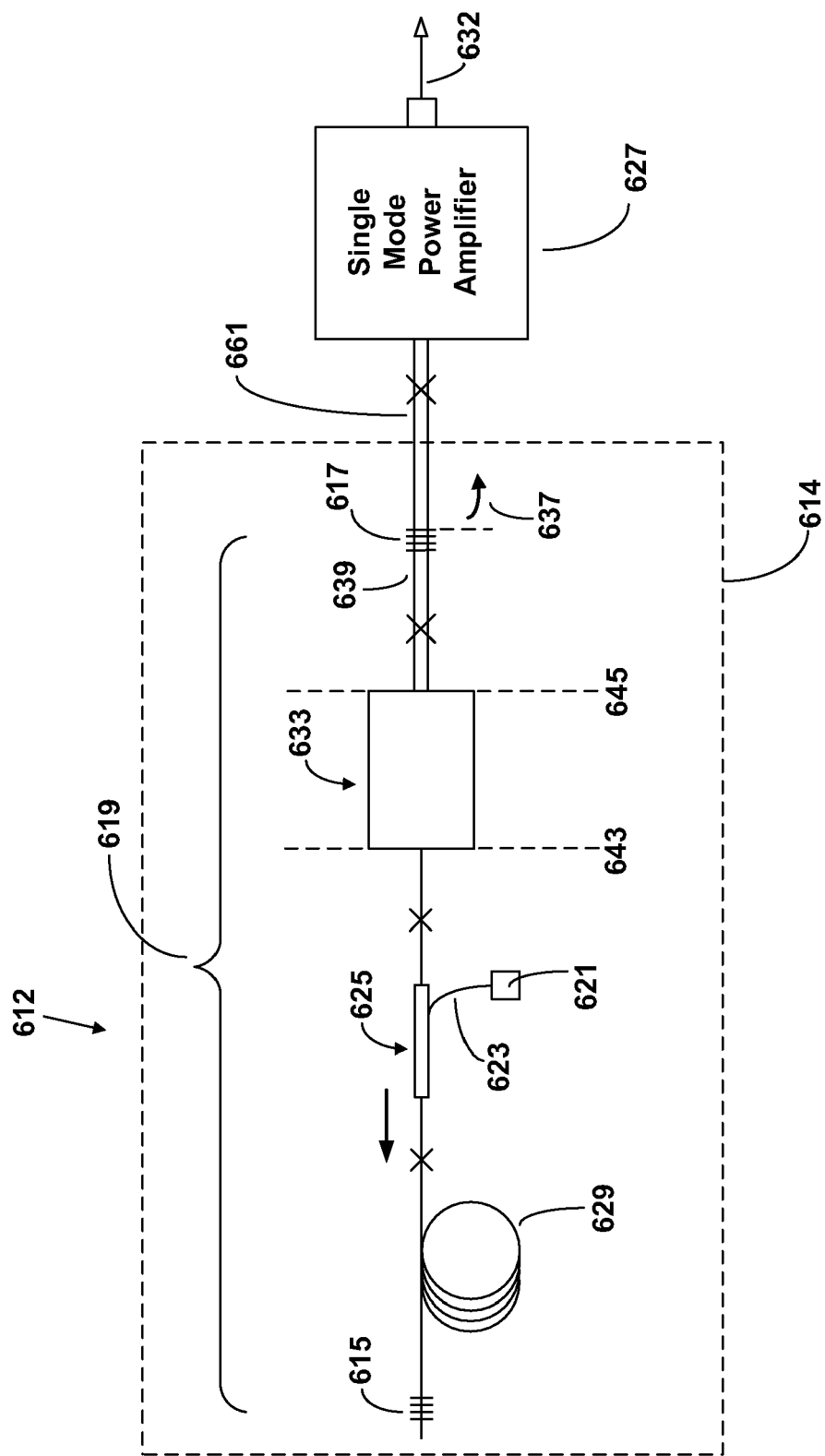
FIG. 6 schematically illustrates another embodiment of an optical fiber master oscillator-power amplifier apparatus according to the invention.

Accordingly, FIG. 6 schematically illustrates yet another embodiment of the invention. The MOPA fiber laser apparatus 612 includes the MO 614 optically coupled to the optical fiber power amplifier 627, which can be a SM amplifier, as described above, if a high beam quality output beam 632 is desired. The MO 614 can comprise a pair of reflectors, 615 and 617, that define a fiber laser cavity 619 that also includes optical fiber that comprises a rare earth for providing optical gain responsive to fiber of the cavity 619 being pumped by pump light. The pump light source 621, which can comprises a pump laser diode or diodes, can be optically coupled to the cavity 619, such as via optical fiber coupler 625 including a pump leg 623 that receives pump light from the light source 621. Many types of pump couplers for coupling pump light to lasers are known in the art. For example, as understood by one of ordinary skill in the art, the optical fiber coupler 625 can comprise a tapered fiber bundle or a side coupler. As indicated by the embodiment shown in FIG. 6, the coupling of pump light to pump the cavity can be achieved within the fiber laser cavity 619. The coupler can be arranged so as to couple pump light substantially only to SM fiber of the fiber laser cavity 619.

The section of optical fiber 629 can comprise the rare earth for providing the aforementioned optical gain of the laser cavity 619 responsive to receiving the pump light. The section 629 of optical fiber can have a length on the order of meters and can comprise a SM core that is doped with the rare earth. The reflector 617 can comprise a fiber Bragg grating written into the core of the section 639 of optical fiber. The reflector 615 can be highly reflective (e.g., nearly 100%) and comprise a fiber Bragg grating written into SM optical fiber. The section 639 of optical fiber can comprise a core that can be MM and have a higher V number, as well as a lower NA, than the core of the section 629 of optical fiber. The reflector 617 can be partially reflective such that it transmits output light from the laser cavity 619 to the section 661 of optical fiber, which is outside of the laser cavity 619, and which can also have a core that is MM and that has a higher V number, as well as lower numerical aperture, than the core of the section 629 of optical fiber. Typically, one or all of the cross sectional area, V number and the numerical aperture of the core of the section 661 of optical fiber will be substantially the same as the cross sectional area, V-number and numerical aperture of the core of the section 639 of optical fiber, though there may be slight differences, as the section 639 may more photosensitive to facilitate writing of the fiber Bragg grating comprised by the reflector 617.

The fiber laser cavity 619 can comprise the optical fiber coupling apparatus 633, which can be, for example, the optical fiber interconnection apparatus 440 of FIG. 4, with reference planes 643 and 645 of FIG. 6 corresponding, respectively, to reference planes 441 and 451, respectively, of FIG. 4. Accordingly, in this configuration, the output reflector 617 shields the coupling apparatus 633 by reflecting at least a portion of the rogue, backward propagating energy back again towards the power amplifier 627, as indicated schematically by arrow 637. The extra margin of protection from rogue, backward propagating optical provided by the configuration shown in FIG. 6 does have a price, however, at least in that the coupling apparatus 633 introduces additional loss into the laser cavity 619, where it may have a greater effect on reducing the overall efficiency of the MOPA 612 due to the resonant nature of the fiber laser cavity 619 than in the configuration shown in FIG. 5.

As is evident from the discussion accompanying FIG. 4, the optical fiber interconnection apparatus 440 can include various sections of optical fiber (e.g., the input, intermediate and output sections of optical fiber). In one practice of the embodiment of the MOPA 612, the section 629 comprises a core that is SM at the output wavelength of the laser cavity 619, and the input section of the interconnection apparatus also comprises a SM core. However, the output section of the optical fiber interconnection apparatus, as well as the section of optical fiber 639, can comprise cores that are MM at the output wavelength and that have lower NAs, but higher V-numbers, than the section 629 and/or the input section of the interconnection apparatus. The output reflector 617 can comprise a fiber Bragg grating that is written in a MM core. Accordingly, the fiber laser cavity 619 can comprise a wavelength of operation at which the laser cavity 619 provides output light via transmission through the output reflector 617, which, as noted above, can comprise a grating written in the MM core of fiber section 639.

In various practices of the invention, the majority (or even, in some practices, most) of the optical gain provided by the fiber laser cavity 619 can be derived from, for example, optical fiber having a SM core (e.g., optical fiber section 629) or from a section of fiber comprised by the cavity having a lower (or even, in some practices, the lowest) V number, NA or cross sectional area as compared to another fiber section comprised by the fiber laser cavity 619 (or in some practices, as compared to all other sections of optical fiber comprised by the fiber laser cavity 619). In one practice the majority or most of the gain of the fiber laser cavity is derived from a section of fiber that meets more than one of the foregoing criteria, such as by having a lower core NA, lower core cross sectional area (and hence a lower V-number) than another section, or of all other sections, of optical fiber comprised by the fiber laser cavity 619. Substantially all, or at least a majority of, the optical gain of the fiber laser cavity 619 can occur within SM fiber of the fiber laser cavity. The fiber laser cavity 619 can include a section of MM optical fiber that is substantially free of the rare earth, or of any rare earth, and the fiber laser cavity 619 can be substantially free of any MM optical fiber that includes the rare earth, or of any rare earth that provides gain or of any rare earth whatsoever.

The section 661 can comprise a MM core for propagating the output light from the fiber laser cavity 619 for providing optical communication with the optical fiber amplifier 627. The optical fiber amplifier 627 can comprise a SM optical fiber power amplifier that is based on optical fiber having an active core that would normally be MM but that is coiled as taught in the '301 patent. A diameter and the NA of the core of an optical fiber comprised by the optical fiber amplifier 627 can be substantially the same as a diameter and the NA of the core of the section 661 of optical fiber.

As some of the rogue light is expected to be reflected by the reflector 617, the optical fiber coupling apparatus 633 may in practice be able to simply comprise a single geometrical and/or NA mismatch between sections of spliced fiber and appropriate provision, as discussed above, for safely disposing of the rogue light directed into the fiber cladding by the mismatch. In this instance the reflector 617 helps distribute the handling of the backward propagating light such that perhaps a second geometrical and/or NA mismatch is not as necessary. In other practices of the invention, the optical fiber coupling apparatus 633 can comprise a tapered section of fiber or a mode field adapter, which may have a higher margin of protection from unduly concentrating rogue energy due to the partial refection thereof by the reflector 617. Generally speaking, the optical fiber of the fiber laser cavity 619 can comprise a first length of optical fiber comprising a core having a first cross sectional area and a second length of fiber having a core having a second cross sectional area that is different than the first cross sectional area and a section of tapered fiber, which may act as an optical fiber mode field adapter, interposed between the first and second lengths of optical fiber for providing optical communication therebetween. On the other hand, the fiber laser cavity 619 can be substantially free of a tapered section of optical fiber, such as, for example, a section of fiber having a tapered core.

In conclusion, as appreciated by one of ordinary skill, in light of the disclosure herein, Applicant has thus taught a number of options for dealing with the problem of damage to one or more components of an optical fiber MOPA apparatus from rogue backward propagating energy. The options vary and reflect various design tradeoffs in terms of simplicity (e.g., number of components), quality of output beam, ease with which a high quality output beam can be provided, operating efficiency and margin of safety from damage from rogue, backward propagating light, etc. The simplest, most elegant option with fewest drawbacks in terms of beam quality and operating efficiency may be the tapered mode field adapter of FIG. 3, designed to perform as a mode field converter for matching the fundamental mode of an optical fiber MM amplifier, with the overall laser configured as a MOPA according to FIG. 1. This option, however, may require more expertise and specialized equipment and/or not have the highest degree of protection from damage due to rogue, backward propagating energy. At the other end of the spectrum, the option having the highest degree of protection from rogue, backward propagating energy is likely the apparatus of FIG. 6, wherein the interconnection apparatus that includes deliberate geometrical and NA mismatches for introducing controlled and distributed losses of rogue light for both light in higher order modes as well as fundamental mode is included within the fiber laser cavity. This latter option, however, has drawbacks in at least complexity and operating efficiency. Higher loss is introduced directly in the cavity, where it has the most effect in reducing operating efficiency. In addition, the lack of mode field adapting provides not only the higher loss but excites higher order modes as well, such that to provide high beam quality from the MOPA apparatus the cavity should provide its output to a more complex SM amplifier. The option found to be most useful in a particular application will depend on many factors, including the desired performance specifications (such as, for example, specifications for power output, operating efficiency, $M^2$ and the like), skill level, equipment available, and experience gained over time in trying different designs in different applications to find optimal tradeoffs between performance and protection in various applications.

Several embodiments of the invention have been described and illustrated herein. Those of ordinary skill in the art will readily envision a variety of other means and structures for performing the functions and/or obtaining the results or advantages described herein and each of such variations or modifications is deemed to be within the scope of the present invention. More generally, those skilled in the art would readily appreciate that all parameters, dimensions, materials and configurations described herein are meant to be exemplary and that actual parameters, dimensions, materials and configurations will depend on specific applications for which the teachings of the present invention are used.

Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described.

It is understood that the use of the term "a," "an" or "one" herein, including in the appended claims, is open ended and means "at least one" or "one or more," unless expressly defined otherwise. The occasional use of the terms herein "at least one" or "one or more" to improve clarity and to remind of the open nature of "one" or similar terms shall not be taken to imply that the use of the terms "a," "an" or "one" alone in other instances herein is closed and hence limited to the singular. Similarly, the use of "a part of," "at least a part of" or similar phrases (e.g., "at least a portion of") shall not be taken to mean that the absence of such a phrase elsewhere is somehow limiting.

Having described the invention, what is claimed as new and to be secured by Letters Patent is:

1. An optical fiber apparatus for having an increased optical power threshold for avoiding damage to the apparatus, comprising:

an optical fiber mode field adapter having an input and an output, said mode field adapter transforming optical energy from a fundamental mode having a smaller mode field diameter at the input to a fundamental mode having larger mode field diameter at the output, said mode field adapter including:
 a length of optical fiber comprising a core including a taper wherein the cross sectional area of the core increases;
 a cladding disposed about said core for tending to confine light to the core so as to be guided by the core;
 a region disposed about the cladding, said region comprising a material contactingly disposed about said cladding and having an index of refraction that is greater than an index of refraction of said cladding by a selected amount, said region stripping optical energy from said cladding, the selected amount being no greater than 0.035; and a second region disposed about and in optical communication with said region, the second region for one of reflecting or absorbing optical energy stripped from said cladding by said region.

2. The optical fiber apparatus of claim 1 wherein said selected amount is no greater than 0.03.

3. The optical fiber apparatus of claim 1 wherein said selected amount is no greater than 0.028.

4. The optical fiber apparatus of claim 1 wherein said selected amount is no greater than 0.026.

5. The optical fiber apparatus of claim 1 wherein said selected amount is no greater than 0.022.

6. The optical fiber apparatus of claim 1 wherein said mode field adapter has a wavelength of operation wherein at said wavelength of operation said mode field adapter is single mode at said input and multimode at said output.

7. The optical fiber apparatus of claim 6 wherein said second region comprises at least one of a metal or a ceramic.

8. The optical fiber apparatus of claim 1 wherein said input and output each comprise a respective length of optical fiber comprising a core, a cladding disposed about said core and a selected region contactingly disposed about said cladding, where said selected region comprises an index of refraction that is different by a predetermined amount than an index of refraction of said cladding and wherein the predetermined amount corresponding to the input length of fiber and the predetermined amount corresponding to the output length of fiber are both greater in magnitude than the magnitude of the selected amount.

9. The optical fiber apparatus of claim 8 wherein the magnitude of the predetermined amount corresponding to the input length of optical fiber is different than the magnitude of the predetermined amount corresponding to the output length of optical fiber.

* * * * *